(12) United States Patent
Kim et al.

(10) Patent No.: US 9,997,074 B2
(45) Date of Patent: Jun. 12, 2018

(54) DISPLAY APPARATUS AND VEHICLE HAVING THE SAME

(71) Applicant: LG ELECTRONICS INC., Seoul (KR)

(72) Inventors: Hansung Kim, Seoul (KR); Pyonho Hong, Seoul (KR); Jaeseung Bae, Seoul (KR); Doohee Lee, Seoul (KR); Juhnho Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 15/299,746

(22) Filed: Oct. 21, 2016

(65) Prior Publication Data

US 2017/0256167 A1 Sep. 7, 2017

(30) Foreign Application Priority Data

Mar. 3, 2016 (KR) .................. 10-2016-0025496

(51) Int. Cl.
*G08G 1/07* (2006.01)
*G08G 1/16* (2006.01)
*G08G 1/0967* (2006.01)

(52) U.S. Cl.
CPC ....... *G08G 1/166* (2013.01); *G08G 1/096783* (2013.01)

(58) Field of Classification Search
None
See application file for complete search history.

(56) References Cited

U.S. PATENT DOCUMENTS

| 6,442,473 | B1 | 8/2002 | Berstis et al. | |
|---|---|---|---|---|
| 2007/0035416 | A1* | 2/2007 | Tanaka | B60T 7/18 340/906 |
| 2011/0025529 | A1* | 2/2011 | Uechi | G08G 1/096783 340/905 |
| 2013/0096822 | A1* | 4/2013 | Sempuku | G01C 21/3629 701/428 |
| 2013/0265414 | A1 | 10/2013 | Yoon et al. | |
| 2015/0314783 | A1 | 11/2015 | Nespolo et al. | |
| 2016/0167580 | A1* | 6/2016 | Hanita | B60Q 9/008 701/301 |
| 2016/0335892 | A1* | 11/2016 | Okada | B60T 7/22 |

(Continued)

FOREIGN PATENT DOCUMENTS

| JP | 2000-222687 A | 8/2000 |
|---|---|---|
| JP | 2000222687 A | 8/2000 |
| JP | 2010-204982 A | 9/2010 |

(Continued)

*Primary Examiner* — Julie Lieu
(74) *Attorney, Agent, or Firm* — Birch, Stewart, Kolasch & Birch, LLP

(57) ABSTRACT

A display apparatus in a vehicle, the display apparatus including a sensor configured to acquire vehicle periphery information; a wireless processor configured to transmit and receive information on a virtual traffic signal to and from another vehicle; a display; and a processor configured to detect another vehicle having a possibility of intersection from the vehicle periphery information, generate the virtual traffic signal based on a position relationship between the vehicle and the other vehicle, and display the generated virtual traffic signal on the display.

21 Claims, 28 Drawing Sheets

(56) References Cited

U.S. PATENT DOCUMENTS

2017/0043715 A1\* 2/2017 Osugi .................. G08G 1/16
2017/0190334 A1\* 7/2017 Zelman ................ B60W 40/09

FOREIGN PATENT DOCUMENTS

| JP | 2010-244290 A | 10/2010 |
| JP | 2016-21125 A | 2/2016 |
| KR | 10-2013-0026933 A | 3/2013 |
| KR | 10-2014-0015824 A | 2/2014 |
| KR | 10-2015-0016381 A | 2/2015 |
| KR | 10-2015-0125607 A | 11/2015 |
| WO | WO 2012/081915 A1 | 6/2012 |
| WO | WO 2014/073871 A1 | 5/2014 |

\* cited by examiner

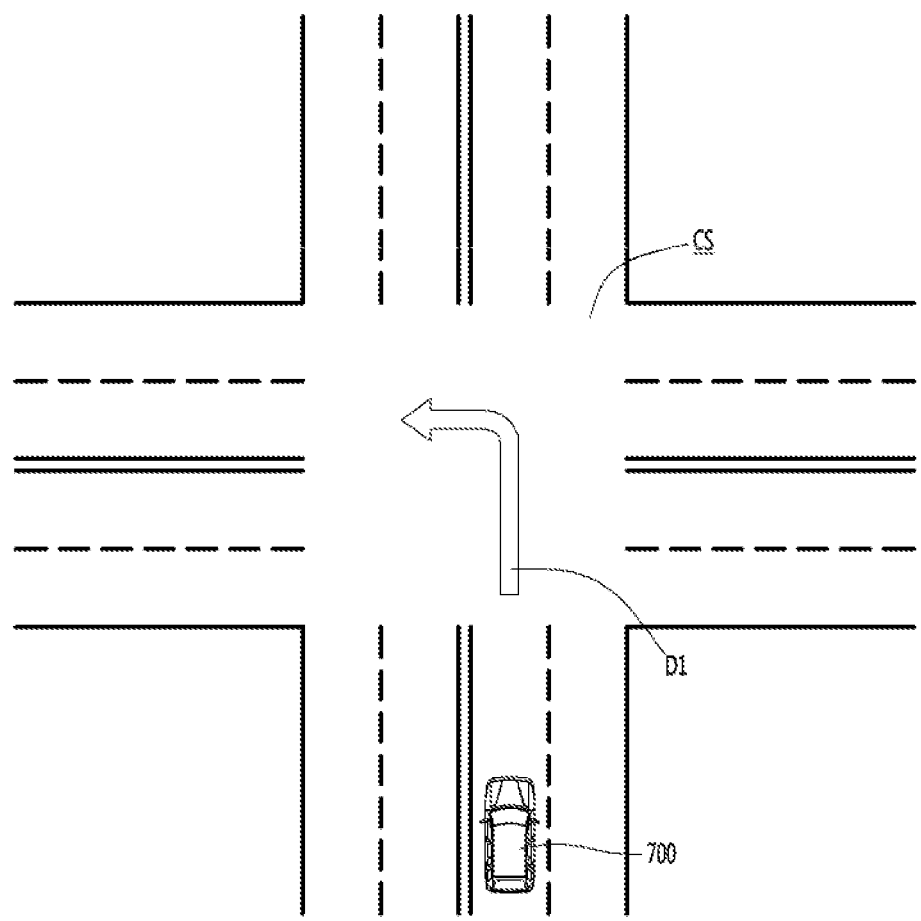

DISPLAY APPARATUS AND VEHICLE HAVING THE SAME

CROSS-REFERENCE TO THE RELATED APPLICATIONS

The present application claims priority under 35 U.S.C. § 119 to Korean Patent Application No. 10-2016-0025496 filed on Mar. 3, 2016, which is hereby incorporated by reference in its entirety.

BACKGROUND OF THE INVENTION

Field of the Invention

The present invention relates to a display apparatus and a vehicle having the same.

Description of the Related Art

A vehicle is an apparatus that transports a user ridding therein in a desired direction. A representative example of a vehicle may be an automobile. A vehicle includes an internal combustion engine vehicle, an external combustion engine vehicle, a gas turbine vehicle, an electric vehicle, etc. according to type of motor used.

The electric vehicle refers to a vehicle for driving an electric motor using electric energy and includes a pure electric vehicle, a hybrid electric vehicle (HEV), a plug-in hybrid electric vehicle (PHEV), a fuel cell electric vehicle (FCEV), etc. Recently, intelligent vehicles have been actively developed for safety or convenience of a driver or pedestrian.

The intelligent vehicle is an advanced vehicle using information technology (IT) and is also referred to as a smart vehicle. The intelligent vehicle provides optimal traffic efficiency by introduction of an advanced vehicle system and via association with an intelligent traffic system (ITS).

In addition, research into a sensor mounted in such an intelligent vehicle has been actively conducted. More specifically, a camera, an infrared sensor, a radar, a global positioning system (GPS), a Lidar, a gyroscope, etc. are used for the intelligent vehicle. Among others, the camera is an important sensor playing the role of human eyes.

Accordingly, with development of various sensors and electronic apparatuses, a vehicle including a driver assistance function for assisting driving of a user and improving driving safety and convenience is attracting considerable attention. However, pieces of driver assistance information provided by various types of devices disperse a driver's gaze and cause the driver to be flustered, thus rather causing a problem.

For example, due to various events indicating danger, alarm, and caution, there is a problem that the driver hardly performs exact driving operation or hardly judges the situation. Further, at an intersection having no signal light or a bottleneck where vehicles may intersect with each other, the driver cannot help predicting a driving state of another vehicle and driving a vehicle by the seat of her or his pants.

When the driver who puts confidence in a traffic signal of a signal light (for example, a road side unit (RSU)) drives a vehicle according to the traffic signal, the vehicle may collide with another vehicle or a pedestrian which violates the traffic signal, in spite of a traffic system, such as the signal light. There is existing technique for receiving and displaying a traffic signal from an intelligent transportation system, but there is a limitation in that the vehicle passively displays the traffic signal received from the intelligent transportation system.

SUMMARY OF THE INVENTION

Embodiments provide a vehicle including the above-described display apparatus.

In one embodiment, a display apparatus comprising: a sensor configured to acquire vehicle periphery information, a communication unit configured to transmit and receive information on a virtual traffic signal to and from another vehicle in a wireless manner, a display unit configured to display the virtual traffic signal, and a processor configured to, when another vehicle having a possibility of intersection is detected from the vehicle periphery information, generate the virtual traffic signal based on a position relationship between a host vehicle and the another vehicle and perform control such that the display unit displays the generated virtual traffic signal.

In still further another embodiment, a vehicle includes a display apparatus according to the above-described embodiment.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 10A is an example of a situation where a virtual traffic signal is provided.

DETAILED DESCRIPTION OF THE EMBODIMENTS

Figure 1:
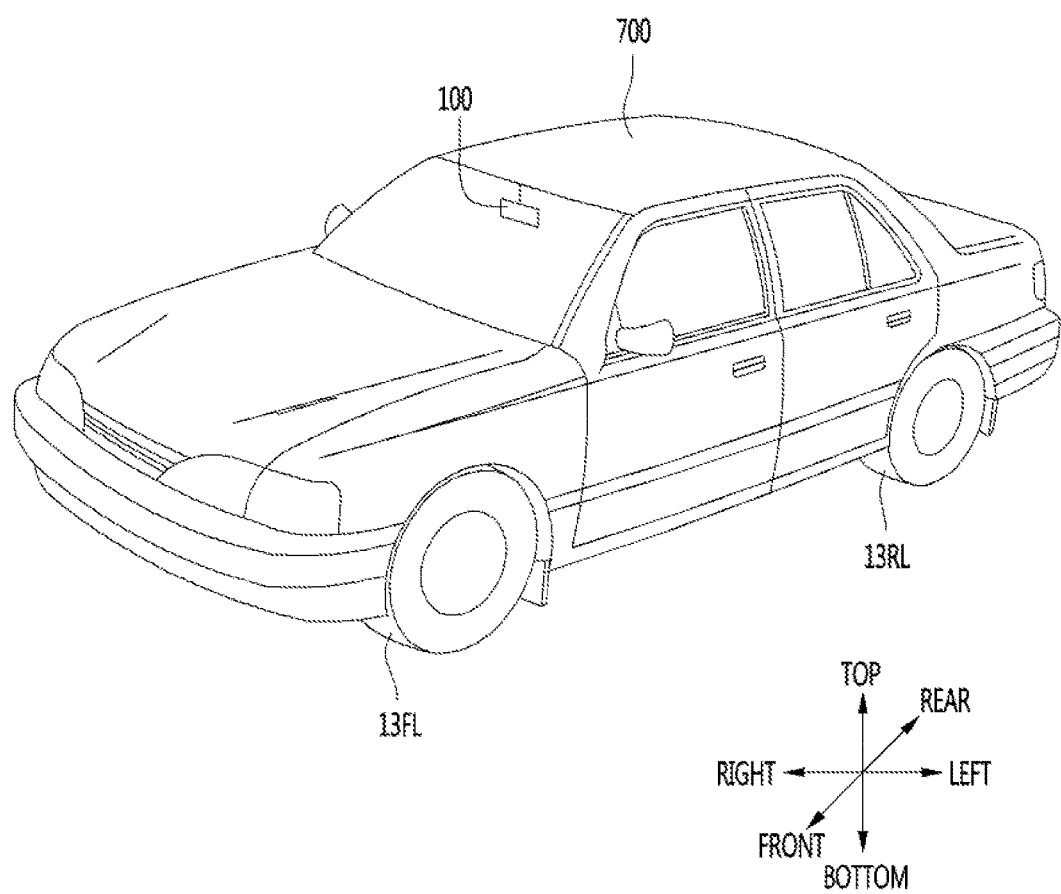
FIG. 1 represents the exterior of a vehicle having a display apparatus according to an embodiment.

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, suffixes "module" and "unit" are used only in consideration of ease in preparation of the specification, and do not have distinct meanings. Accordingly, the suffixes "module" and "unit" may be used interchangeably.

In addition, the accompanying drawings are provided only for a better understanding of the embodiments disclosed in the present specification and are not intended to limit technical ideas disclosed in the present specification. Therefore, it should be understood that the accompanying drawings include all modifications, equivalents and substitutions within the scope and sprit of the present invention.

Although the terms first, second, etc., may be used herein to describe various components, these components should not be limited by these terms. These terms are only used to distinguish one component from another component. When a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless context clearly indicates otherwise. In the present application, it will be further understood that the terms "comprises", includes," etc. specify the presence of stated features, integers, steps, operations, elements, components, or combinations thereof, but do not preclude the presence or addition of one or more other features, integers, steps, operations, elements, components, or combinations thereof.

A vehicle as described in this specification may include a car and a motorcycle. Hereinafter, a car will be focused upon. A vehicle as described in this specification may include all of an internal combustion engine vehicle including an engine as a power source, a hybrid vehicle including both an engine and an electric motor as a power source, and an electric vehicle including an electric motor as a power source.

In the following description, the left of a vehicle means the left of the vehicle in the direction of travel and the right of the vehicle means the right of the vehicle in the direction of travel. Further, a left hand drive (LHD) vehicle will be focused upon unless otherwise stated.

In the following description, the display apparatus is provided in a vehicle to exchange information necessary for data communication with the vehicle and to perform a driver assistance function. A set of some units of the vehicle may be defined as a display apparatus.

When the display apparatus is separately provided, at least some units (see FIG. 2) of the display apparatus are not included in the display apparatus but may be units of the vehicle or units of another apparatus mounted in the vehicle. Such external units transmit and receive data via an interface of the display apparatus and thus may be understood as being included in the display apparatus. Hereinafter, for convenience of description, assume that the display apparatus according to the embodiment directly includes the units shown in FIG. 2.

Referring to FIG. 1, the vehicle according to the embodiment includes wheels 13FL and 13RL rotated by a power source and a display apparatus 100 for providing driver assistance information to a user. The display apparatus 100 may be a display apparatus mounted on a vehicle or a mobile terminal communicable with a vehicle. The following description will be given under the assumption that the display apparatus 100 is a display apparatus mounted within the vehicle to display a virtual traffic signal by using a graphic image.

When another vehicle having a possibility of intersection is detected in the vicinity of a host vehicle, the display apparatus 100 may display a virtual traffic signal based on a position relationship between the another vehicle and the host vehicle, providing operation to be performed by a driver.

Herein, the "possibility of intersection" means that a predicted movement route of the host vehicle and a predicted movement route of another vehicle have an intersection area in which they overlap each other. In another aspect, the "possibility of intersection" means that an extended line of the movement route of the host vehicle and an extended line of the movement route of the another vehicle intersect with each other.

Also, the virtual traffic signal may include a blue light icon indicating driving permission, a red light icon indicating driving prohibition, and a yellow light icon indicating driving caution. That is, when another vehicle having risk of collision is detected, the display apparatus 100 generates and displays a virtual traffic signal, thus inducing a driver to intuitively perform driving operation in consideration of the risk of collision, preventing collision.

In this instance, the display apparatus 100 shares the virtual traffic signal with the another vehicle through wireless communication, thus providing the pre-agreed virtual traffic signal, inducing safe driving, and enhancing traffic efficiency.

Figure 2:
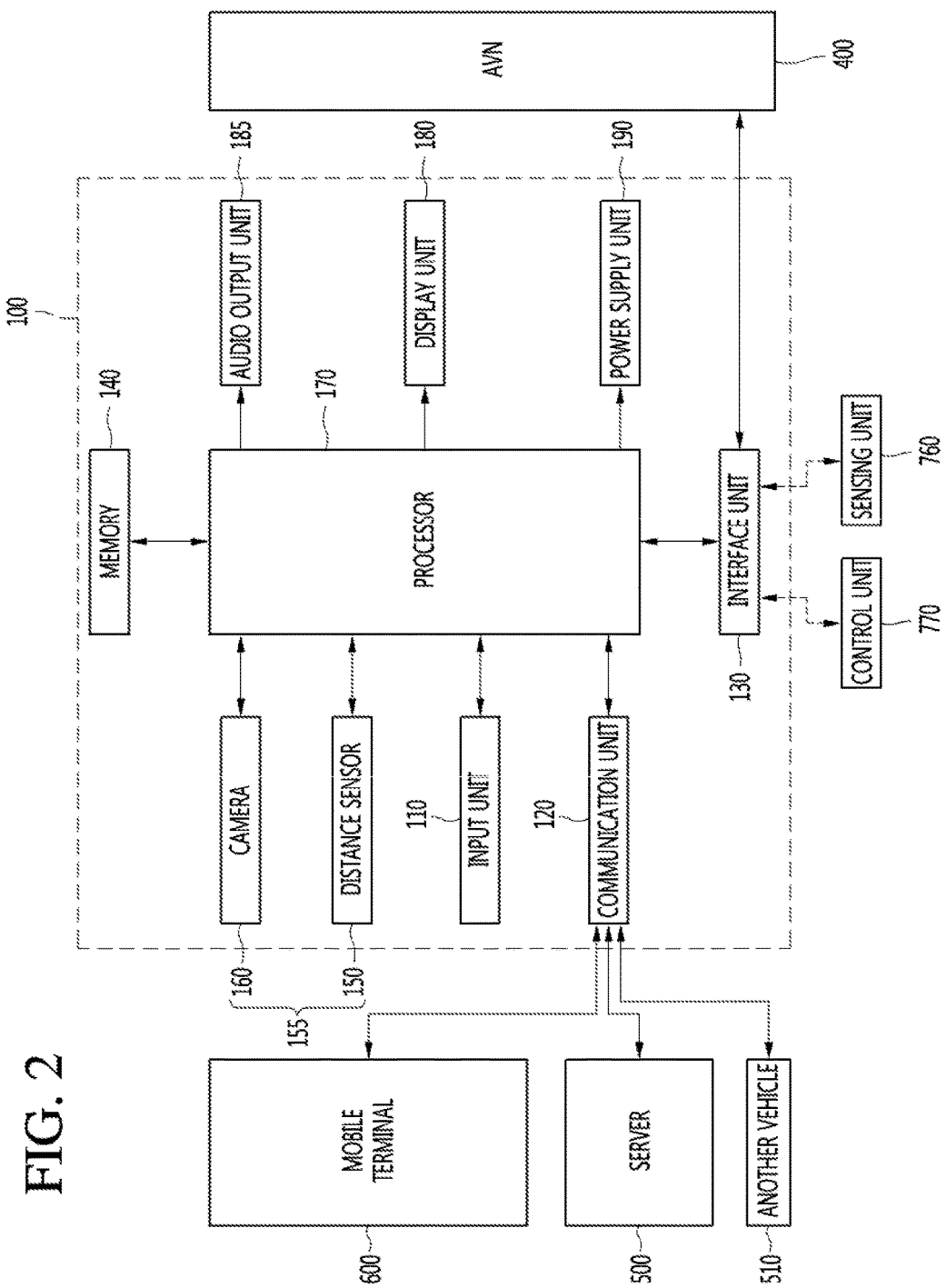
FIG. 2 is a block diagram of a display apparatus according to an embodiment of the present invention.

In the following, components constituting the display apparatus 100 will be described in detail with reference to FIGS. 2 to 7. Referring to FIG. 2, such a display apparatus 100 may include an input unit 110, a communication unit 120, an interface 130, a memory 140, a sensor unit 155, a processor 170, a display unit 180, an audio output unit 185 and a power supply 190. The units of the display apparatus 100 shown in FIG. 2 are not essential to implementation of the display apparatus 100 and thus the display apparatus 100 described in the present specification may have components greater or less in number than the number of the above-described components.

Each component will now be described in detail. The display apparatus 100 may include the input unit 110 for receiving user input. A user can perform input for settings of a virtual traffic display function provided by the display apparatus 100 or turn on/off the power supply of the display apparatus 100, through the input unit 110. For example, the user may set a region on which the virtual traffic signal is to be displayed, a size of the virtual traffic signal, or the like, through the input unit 110.

The input unit 110 may include at least one of a gesture input unit (e.g., an optical sensor, etc.) for sensing a user gesture, a touch input unit (e.g., a touch sensor, a touch key, a push key (mechanical key), etc.) for sensing touch and a microphone for sensing voice input and receive user input.

Next, the display apparatus 100 may include the communication unit 120 for communicating with another vehicle 510, a terminal 600 and a server 500. The display apparatus 100 may receive communication information including at least one of navigation information, driving information of another vehicle and traffic information via the communication unit 120. In contrast, the display apparatus 100 may transmit information on this vehicle via the communication unit 120.

The communication information may be included in vehicle periphery information. Further, the display apparatus 100 may transmit information on the host vehicle through the communication unit 120.

According to an embodiment, the communication unit 120 may transmit and receive information on a virtual traffic signal (hereinafter referred to as "virtual traffic signal information") to and from the another vehicle 510 in a wireless manner. Specifically, the communication unit 120 may receive the virtual traffic signal information from the another vehicle 510 that is in a predetermined distance range and transmit the virtual traffic signal information generated by the processor 170 to the another vehicle 510.

Also, the another vehicle 510 and the display apparatus 100 may generate a pre-agreed virtual traffic signal together based on information transmitted and received through the communication unit 120. In more detail, the communication unit 120 may receive at least one of position information, weather information and road traffic condition information (e.g., transport protocol experts group (TPEG), etc.) from the mobile terminal 600 and/or the server 500.

The communication unit 120 may receive traffic information from the server 500 having an intelligent traffic system (ITS). Here, the traffic information may include traffic signal information, lane information, vehicle surrounding information or position information.

In addition, the communication unit 120 may receive navigation information from the server 500 and/or the mobile terminal 600. Here, the navigation information may include at least one of map information related to vehicle driving, lane information, vehicle position information, set destination information and route information according to the destination.

For example, the communication unit 120 may receive the real-time position of the vehicle as the navigation information. In more detail, the communication unit 120 may include a global positioning system (GPS) module and/or a Wi-Fi (Wireless Fidelity) module and acquire the position of the vehicle.

In addition, the communication unit 120 may receive driving information of the other vehicle 510 from the other vehicle 510 and transmit information on this vehicle, thereby sharing driving information between vehicles. Here, the shared driving information may include vehicle traveling direction information, position information, vehicle speed information, acceleration information, moving route information, forward/reverse information, adjacent vehicle information and turn signal information.

In addition, when a user rides in the vehicle, the mobile terminal 600 of the user and the display apparatus 100 may pair with each other automatically or by executing a user application. The communication unit 120 may exchange data with the other vehicle 510, the mobile terminal 600 or the server 500 in a wireless manner.

In more detail, the communication module 120 can perform wireless communication using a wireless data communication method. As the wireless data communication method, technical standards or communication methods for mobile communications (for example, Global System for Mobile Communication (GSM), Code Division Multiple Access (CDMA), CDMA2000 (Code Division Multiple Access 2000), EV-DO (Evolution-Data Optimized), Wideband CDMA (WCDMA), High Speed Downlink Packet Access (HSDPA), HSUPA (High Speed Uplink Packet Access), Long Term Evolution (LTE), LTE-A (Long Term Evolution-Advanced), and the like) may be used.

The communication unit module 120 is configured to facilitate wireless Internet technology. Examples of such wireless Internet technology include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like.

In addition, the communication unit 120 is configured to facilitate short-range communication. For example, short-range communication may be supported using at least one of Bluetooth™, Radio Frequency IDentification (RFID), Infrared Data Association (IrDA), Ultra-Wideband (UWB), ZigBee, Near Field Communication (NFC), Wireless-Fidelity (Wi-Fi), Wi-Fi Direct, Wireless USB (Wireless Universal Serial Bus), and the like.

In addition, the display apparatus 100 may pair with the mobile terminal located inside the vehicle using a short-range communication method and wirelessly exchange data with the other vehicle 510 or the server 500 using a long-distance wireless communication module of the mobile terminal.

Next, the display apparatus 100 may include the interface 130 for receiving data of the vehicle and transmitting a signal processed or generated by the processor 170. Specifically, the display apparatus 100 may receive at least one of the driving information, navigation information, and sensor information of another vehicle through the interface unit 130. The received information may be included in the vehicle periphery information.

Also, the display apparatus 100 may transmit a signal for controlling a driver assistance function, information generated by the display apparatus 100, or the like to the control unit 770 of the vehicle through the interface unit 130 based on the virtual traffic signal. For example, the display apparatus 100 can control an Idle Stop and Go (ISG) function based on the virtual traffic signal. Specifically, the display apparatus 100 performs control to stop an engine of the vehicle during a driving stop time, thus reducing unnecessary fuel consumption.

Thus, the interface 130 can perform data communication with at least one of the controller 770 of the vehicle, an audio-video-navigation (AVN) apparatus 400 and the sensing unit 760 using a wired or wireless communication method. In more detail, the interface 130 may receive navigation information by data communication with the controller 770, the AVN apparatus 400 and/or a separate navigation apparatus.

In addition, the interface 130 may receive sensor information from the controller 770 or the sensing unit 760. Here, the sensor information may include at least one of vehicle traveling direction information, vehicle position information, vehicle speed information, acceleration information, vehicle tilt information, forward/reverse information, fuel information, information on a distance from a preceding/rear vehicle, information on a distance between a vehicle and a lane and turn signal information, etc.

The sensor information may be acquired from a heading sensor, a yaw sensor, a gyro sensor, a position module, a vehicle forward/reverse sensor, a wheel sensor, a vehicle speed sensor, a vehicle tilt sensor, a battery sensor, a fuel sensor, a tire sensor, a steering sensor based on rotation of the steering wheel, a vehicle interior temperature sensor, a vehicle interior humidity sensor, a door sensor, etc. The position module may include a GPS module for receiving GPS information.

The interface 130 may receive user input via the user input unit 110 of the vehicle. The interface 130 may receive user input from the input unit of the vehicle or via the controller 770. That is, when the input unit is provided in the vehicle, user input may be received via the interface 130.

In addition, the interface 130 may receive traffic information acquired from the server. The server 500 may be located at a traffic control surveillance center for controlling traffic. For example, when traffic information is received from the server 500 via the communication unit 120 of the vehicle, the interface 130 may receive traffic information from the controller 770.

Next, the memory 140 may store a variety of data for overall operation of the display apparatus 100, such as a program for processing or control of the controller 170. In addition, the memory 140 may store data and commands for operation of the display apparatus 100 and a plurality of application programs or applications executed in the display apparatus 100. At least some of such application programs may be downloaded from an external server through wireless communication. At least one of such application programs may be installed in the display apparatus 100 upon release, in order to provide the basic function (e.g., the driver assistance information guide function) of the display apparatus 100.

Such application programs may be stored in the memory 140 and may be executed to perform operation (or function) of the display apparatus 100 by the processor 170. The memory 140 may store data for checking an object included in an image. For example, the memory 140 may store data for checking a predetermined object using a predetermined algorithm when the predetermined object is detected from an image of the vicinity of the vehicle acquired through the camera 160.

For example, the memory 140 may store data for checking the object using the predetermined algorithm when the predetermined algorithm such as a lane, a traffic sign, a two-wheeled vehicle and a pedestrian is included in an image acquired through the camera 160.

The memory 140 may be implemented in a hardware manner using at least one selected from among a flash memory, a hard disk, a solid state drive (SSD), a silicon disk drive (SDD), a micro multimedia card, a card type memory (e.g., an SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk and an optical disc. In addition, the display apparatus 100 may operate in association with a network storage for performing a storage function of the memory 140 over the Internet.

Next, the display apparatus 100 may further include the sensor unit 155 for sensing objects located in the vicinity of the vehicle. The display apparatus 100 may include the sensor unit 155 for sensing peripheral objects and may receive the sensor information obtained by the sensing unit 770 of the vehicle via the interface 130. The acquired sensor information may be included in the information on the vehicle surrounding information.

The sensor unit 155 may include at least one of a distance sensor 150 for sensing the position of an object located in the vicinity of the vehicle and a camera 160 for capturing the image of the vicinity of the vehicle. First, the distance sensor 150 may accurately sense the position of the object located in the vicinity of the vehicle, a distance between the object and the vehicle, a movement direction of the object, etc. The distance sensor 150 may continuously measure the position of the sensed object to accurately sense change in positional relationship with the vehicle.

The distance sensor 150 may sense the object located in at least one of the front, rear, left and right areas of the vehicle. The distance sensor 150 may be provided at various positions of the vehicle. In more detail, referring to FIG. 3, the distance sensor 150 may be provided at least one of the front, rear, left and right sides and ceiling of the vehicle.

The distance sensor 150 may include at least one of various distance measurement sensors such as a Lidar sensor, a laser sensor, an ultrasonic wave sensor and a stereo camera. For example, the distance sensor 150 is a laser sensor and may accurately measure a positional relationship between the vehicle and the object using a time-of-flight (TOF) and/or a phase-shift method according to a laser signal modulation method.

Information on the object may be acquired by analyzing the image captured by the camera 160 at the processor 170. In more detail, the display apparatus 100 may capture the image of the vicinity of the vehicle using the camera 160, analyze the image of the vicinity of the vehicle using the processor 170, detect the object located in the vicinity of the vehicle, determine the attributes of the object and generate sensor information.

The image information is at least one of the type of the object, traffic signal information indicated by the object, the distance between the object and the vehicle and the position of the object and may be included in the sensor information. In more detail, the processor 170 may detect the object from the captured image via image processing, track the object, measure the distance from the object, and check the object to analyze the object, thereby generating image information.

The camera 160 may be provided at various positions. In more detail, the camera 160 may include an internal camera 160f for capturing an image of the front side of the vehicle within the vehicle and acquiring a front image.

Figure 3:
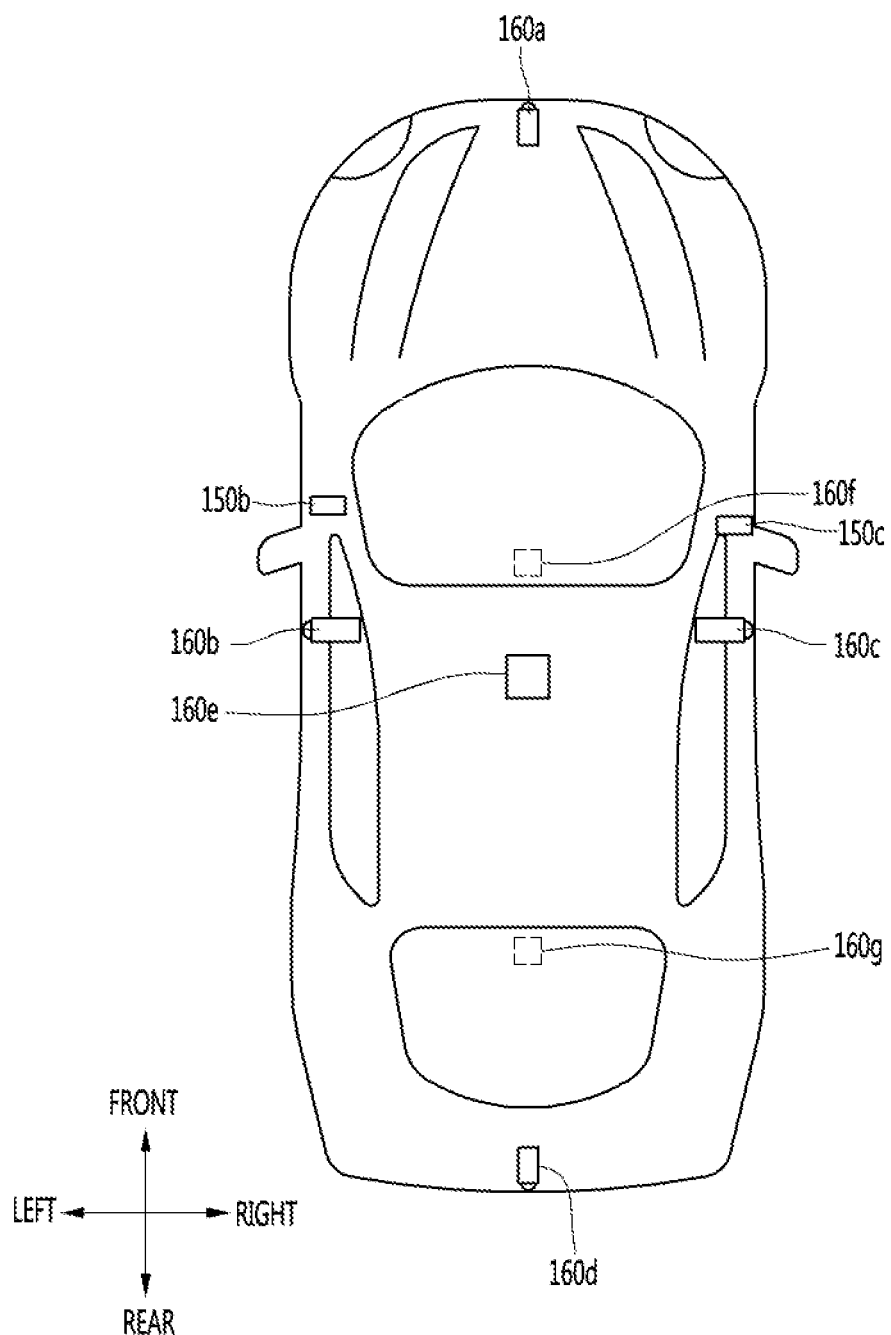
FIG. 3 is a plan view of a vehicle having a display apparatus according to an embodiment of the present invention.

Referring to FIG. 3, a plurality of cameras 160 may be provided at least one of the front, rear, right and left and ceiling of the vehicle. In more detail, the left camera 160b may be provided inside a case surrounding a left side mirror. Alternatively, the left camera 160b may be provided outside the case surrounding the left side mirror. Alternatively, the left camera 160b may be provided in one of a left front door, a left rear door or an outer area of a left fender.

The right camera 160c may be provided inside a case surrounding a right side mirror. Alternatively, the right camera 160c may be provided outside the case surrounding the right side mirror. Alternatively, the right camera 160c may be provided in one of a right front door, a right rear door or an outer area of a right fender.

In addition, the rear camera 160d may be provided in the vicinity of a rear license plate or a trunk switch. The front camera 160a may be provided in the vicinity of an emblem or a radiator grill. The processor 170 may synthesize images captured in all directions and provide an around view image viewed from the top of the vehicle. Upon generating the around view image, boundary portions between the image regions occur. Such boundary portions may be subjected to image blending for natural display.

In addition, the ceiling camera 160e may be provided on the ceiling of the vehicle to capture the image of the vehicle in all directions. The camera 160 may directly include an image sensor and an image processing module. The camera 160 may process a still image or a moving image obtained by the image sensor (e.g., CMOS or CCD). In addition, the image processing module processes the still image or the moving image acquired through the image sensor, extracts necessary image information, and delivers the extracted image information to the processor 170.

In order to enable the processor 170 to more easily perform object analysis, in the embodiment, the camera 160 may be a stereo camera for capturing an image and, at the same time, measuring a distance from an object. The sensor unit 155 may be a stereo camera including the distance sensor 150 and the camera 160. That is, the stereo camera may acquire an image and, at the same time, sense a positional relationship with the object.

Figure 4:
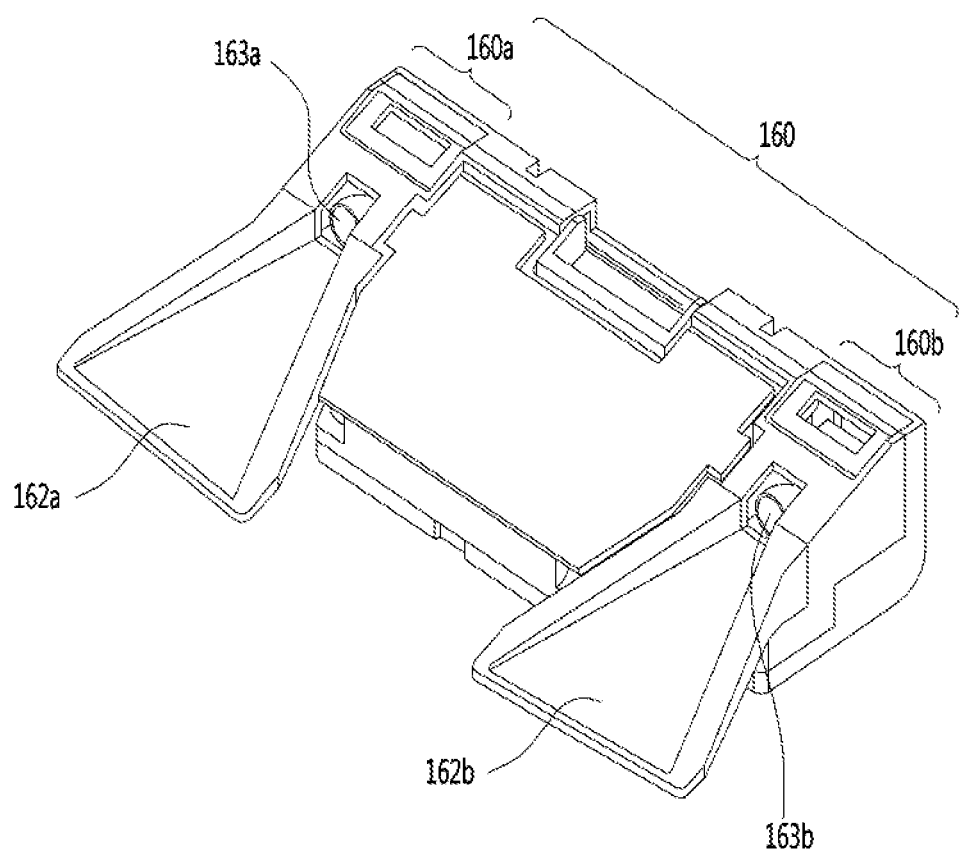
FIG. 4 is a diagram showing an example of a camera according to an embodiment of the present invention.

Hereinafter, referring to FIGS. 4 to 6, the stereo camera and a method of detecting image information by the processor 170 using the stereo camera will be described in greater detail. First, referring to FIG. 4, the stereo camera 160 may include a first camera 160a including a first lens 163a and a second camera 160b including a second lens 163b.

The display apparatus 100 may further include first and second light shield units 162a and 162b for shielding light incident upon the first and second lenses 163a and 163b. The display apparatus 100 may acquire stereo images of the vicinity of the vehicle from the first and second cameras 160a and 160b, detect disparity based on the stereo images, detect an object from at least one stereo image, and continuously track movement of the object after object detection.

Figure 5:
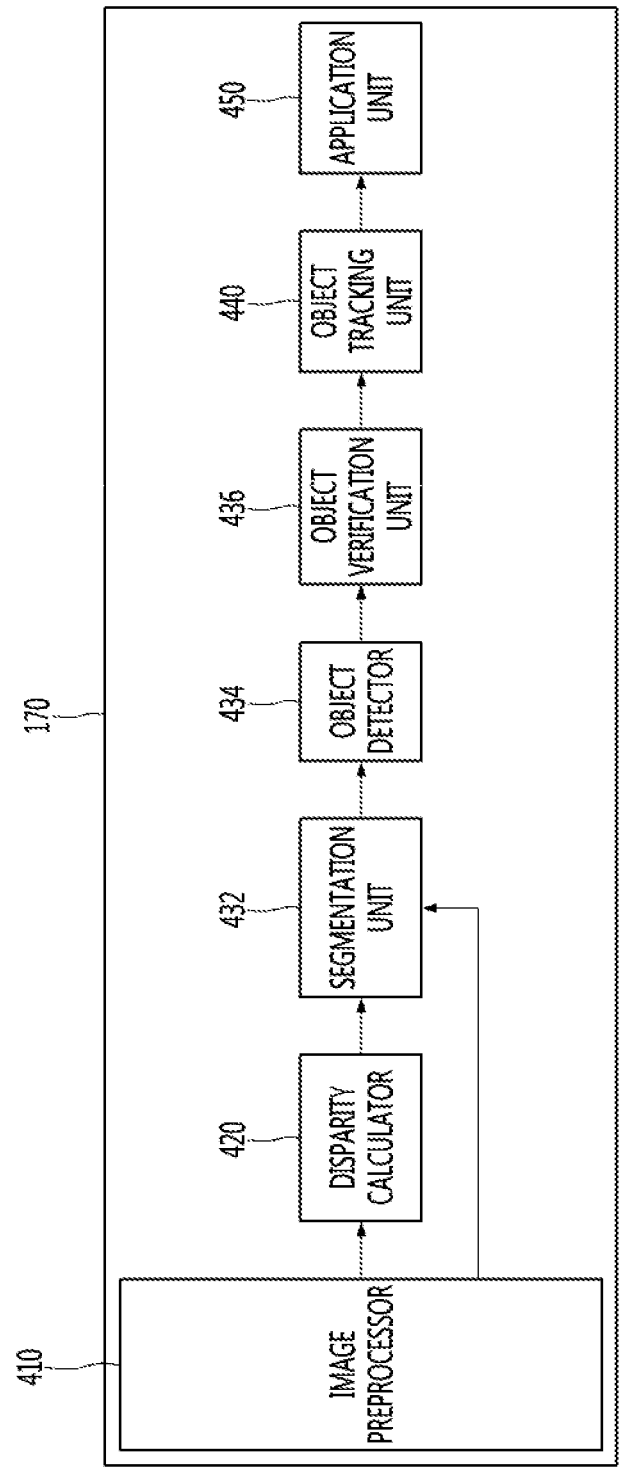
FIGS. 5 and 6 are diagrams illustrating an example of a method of generating image information from an image of a camera according to an embodiment of the present invention.

Referring to FIG. 5, as one example of the block diagram of the internal configuration of the processor 170, the processor 170 of the display apparatus 100 may include an image preprocessor 410, a disparity calculator 420, an object detector 434, an object tracking unit 440 and an application unit 450. Although an image is processed in order of the image preprocessor 410, the disparity calculator 420, the object detector 434, the object tracking unit 440 and the application unit 450 in FIG. 5 and the following description, the present invention is not limited thereto.

The image preprocessor 410 may receive an image from the camera 160 and perform preprocessing. In more detail, the image preprocessor 410 can perform noise reduction, rectification, calibration, color enhancement, color space conversion (CSC), interpolation, camera gain control, etc. of the image. An image having definition higher than that of the stereo image captured by the camera 160 may be acquired.

The disparity calculator 420 may receive the images processed by the image preprocessor 410, perform stereo matching of the received images, and acquire a disparity map according to stereo matching. That is, disparity information of the stereo image of the front side of the vehicle may be acquired.

At this time, stereo matching may be performed in units of pixels of the stereo images or predetermined block units. The disparity map may refer to a map indicating the numerical value of binocular parallax information of the stereo images, that is, the left and right images.

The segmentation unit 432 can perform segmentation and clustering with respect to at least one image based on the disparity information from the disparity calculator 420. In more detail, the segmentation unit 432 may segment at least one stereo image into a background and a foreground based on the disparity information.

For example, an area in which the disparity information is less than or equal to a predetermined value within the disparity map may be calculated as the background and excluded. Therefore, the foreground may be segmented. As another example, an area in which the disparity information is greater than or equal to a predetermined value within the disparity map may be calculated as the foreground and extracted. Therefore, the foreground may be segmented. The background and the foreground may be segmented based on the disparity information extracted based on the stereo images to reduce signal processing speed, the amount of processed signals, etc. upon object detection.

Next, the object detector 434 may detect the object based on the image segment from the segmentation unit 432. That is, the object detector 434 may detect the object from at least one image based on the disparity information. In more detail, the object detector 434 may detect the object from at least one image. For example, the object may be detected from the foreground segmented by image segmentation.

Next, the object verification unit 436 may classify and verify the segmented object. Thus, the object verification unit 436 may use an identification method using a neural network, a support vector machine (SVM) method, an identification method by AdaBoost using Haar-like features or a histograms of oriented gradients (HOG) method.

The object verification unit 436 may compare the objects stored in the memory 140 and the detected object and verify the object. For example, the object verification unit 436 may verify a peripheral vehicle, a lane, a road surface, a traffic sign, a danger zone, a tunnel, etc. located in the vicinity of the vehicle.

The object tracking unit 440 may track the verified object. For example, the objects in the sequentially acquired stereo images may be verified, motion or motion vectors of the verified objects may be calculated and motion of the objects may be tracked based on the calculated motion or motion vectors. A peripheral vehicle, a lane, a road surface, a traffic sign, a danger zone, a tunnel, etc. located in the vicinity of the vehicle may be tracked.

Next, the application unit 450 may calculate a degree of risk, etc. based on various objects located in the vicinity of the vehicle, for example, another vehicle, a lane, a road surface, a traffic sign, etc. In addition, possibility of collision with a preceding vehicle, whether a vehicle slips, etc. may be calculated.

The application unit 450 may output a message indicating such information to the user as driver assistance information based on the calculated degree of risk, possibility of collision or slip. Alternatively, a control signal for vehicle attitude control or driving control may be generated as vehicle control information.

The image preprocessor 410, the disparity calculator 420, the segmentation unit 432, the object detector 434, the object verification unit 436, the object tracking unit 440 and the application unit 450 may be included in the image processor (see FIG. 31) of the processor 170.

In some embodiments, the processor 170 may include only some of the image preprocessor 410, the disparity calculator 420, the segmentation unit 432, the object detector 434, the object verification unit 436, the object tracking unit 440 and the application unit 450. If the camera 160 includes a mono camera 160 or an around view camera 160, the disparity calculator 420 may be excluded. In some embodiments, the segmentation unit 432 may be excluded.

Figure 6:
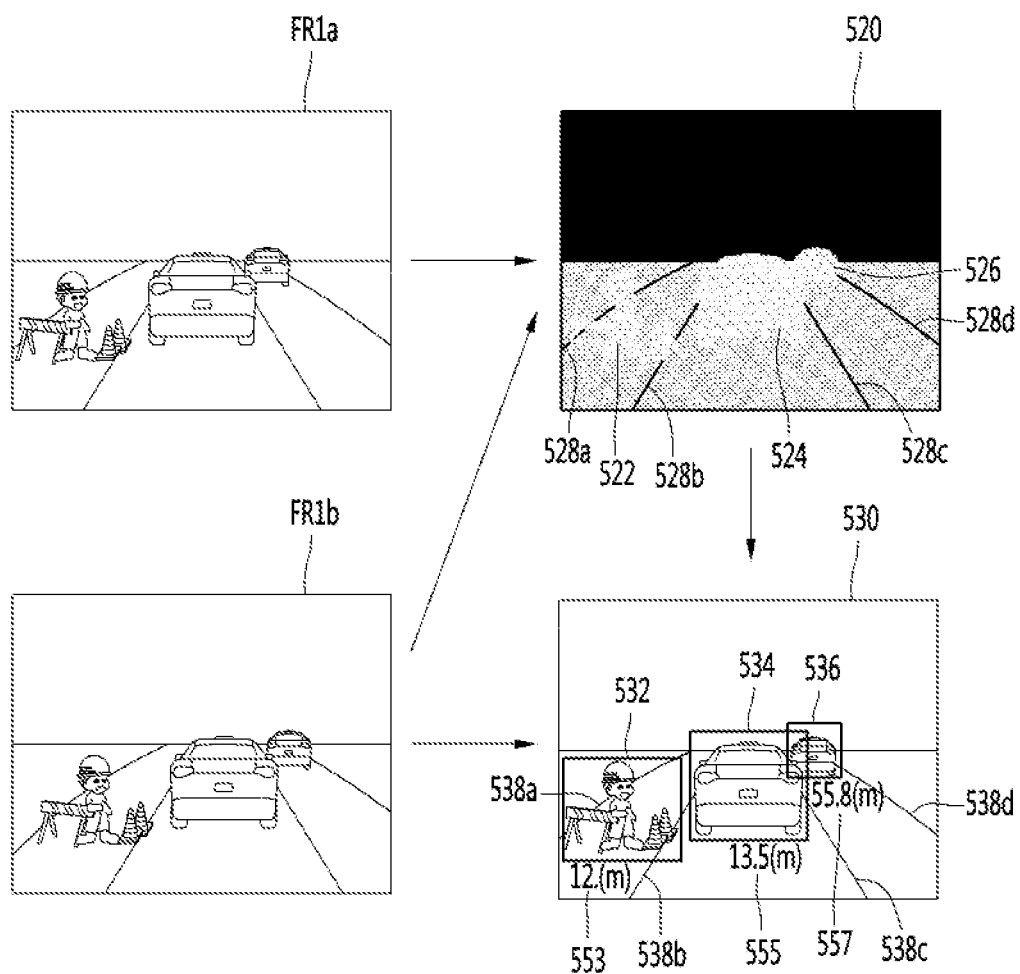
Figure 7:
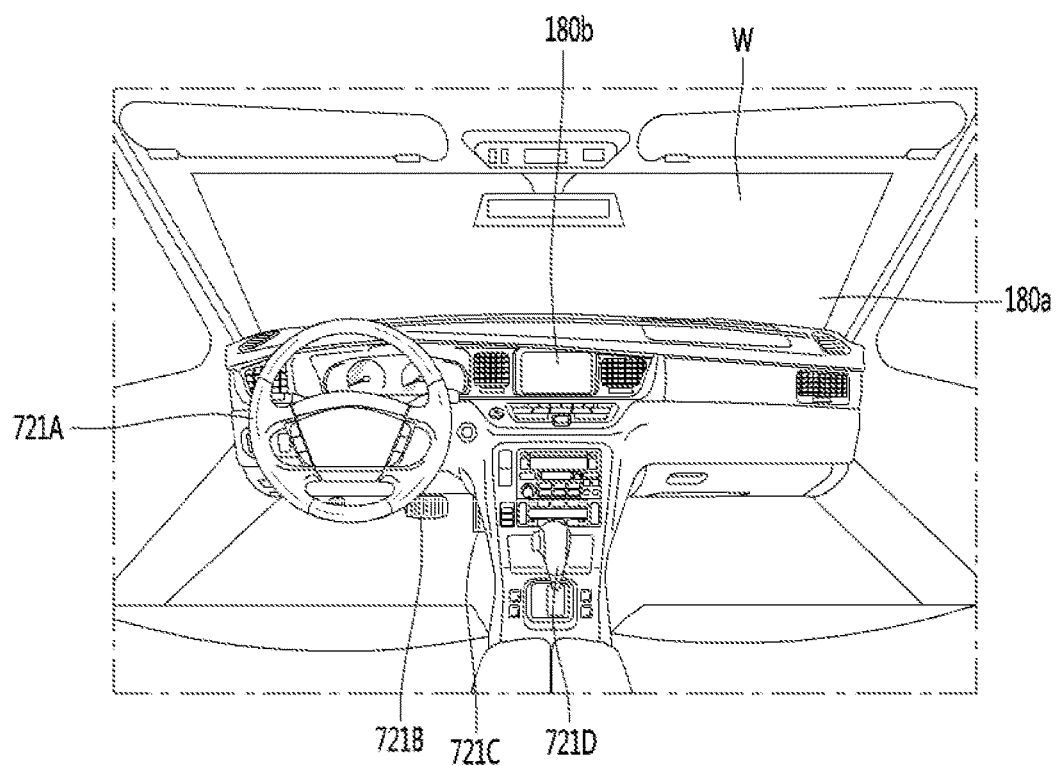
FIG. 7 is a diagram showing the inside of a vehicle having a display apparatus according to an embodiment of the present invention.

Referring to FIG. 6, during a first frame period, the camera 160 may acquire stereo images. The disparity calculator 420 of the processor 160 receives stereo images FR1a and FR1b processed by the image preprocessor 410, performs stereo matching with respect to the stereo images FR1a and FR1b and acquires a disparity map 520.

The disparity map 520 indicates the levels of binocular parallax between the stereo images FR1a and FR1b. As a disparity level increases, a distance from a vehicle may decrease and, as the disparity level decreases, the distance from the vehicle may increase. When such a disparity map is displayed, luminance may increase as the disparity level increases and decrease as the disparity level decreases.

In the figure, disparity levels respectively corresponding to first to fourth lanes 528a, 528b, 528c and 528d and disparity levels respectively corresponding to a construction area 522, a first preceding vehicle 524 and a second preceding vehicle 526 are included in the disparity map 520.

The segmentation unit 432, the object detector 434 and the object verification unit 436 can perform segmentation, object detection and object verification with respect to at least one of the stereo images FR1a and FR1b based on the disparity map 520. In the figure, object detection and verification are performed with respect to the second stereo image FR1b using the disparity map 520.

That is, object detection and verification are performed with respect to the first to fourth lanes 538a, 538b, 538c and 538d, the construction area 532, the first preceding vehicle 534 and the second preceding vehicle 536 of the image 530. With image processing, the display apparatus 100 may acquire various surrounding information of the vehicle, such as peripheral objects or the positions of the peripheral objects, using the sensor unit 155, as sensor information. The vehicle periphery information acquired as described above may be a basis to determine whether to generate a virtual traffic signal or a basis to generate the virtual traffic signal.

Next, the display apparatus 100 may further include a display unit 180 which displays a graphic image associated with the virtual traffic signal. Specifically, the display unit may display the virtual traffic signal including a first graphic image indicating driving permission, a second graphic image indicating driving caution and a third graphic image indicating driving prohibition.

For example, with compliance with the domestic traffic law, the display unit 180 may provide the virtual traffic signal to a driver in such a way to display a blue light indicating driving permission, a yellow light indicating driving caution, and a red light indicating driving prohibition by using icons, and display activation and deactivation of the lights according to the virtual traffic signal.

Specifically, when the virtual traffic signal includes information indicating permission of the vehicle's entry to an intersection, the display unit 180 displays a graphic image in which a blue light is turned on and the remaining lights are turned off, thereby displaying the virtual traffic signal.

The display unit 180 may include a plurality of displays. In more detail, the display unit 180 may include a first display 180a for projecting and displaying a graphic image onto and on a vehicle windshield W. That is, the first display 180a is a head up display (HUD) and may include a projection module for projecting the graphic image onto the windshield W. The graphic image projected by the projection module may have predetermined transparency. Accordingly, a user may simultaneously view the front and rear sides of the graphic image.

The graphic image may overlap the image projected onto the windshield W to achieve augmented reality (AR). The display unit may include a second display 180b separately provided inside the vehicle to display an image of the driver assistance function. In more detail, the second display 180b may be a display of a vehicle navigation apparatus or a cluster located at an internal front side of the vehicle.

The second display 180b may include at least one selected from among a Liquid Crystal Display (LCD), a Thin Film Transistor LCD (TFT LCD), an Organic Light Emitting Diode (OLED), a flexible display, a 3D display, and an e-ink display. The second display 180b may be combined with a touch input unit to achieve a touchscreen.

Next, the audio output unit 185 may audibly output a message illustrating the function of the display apparatus 100 and checking whether the driver assistance function is performed. That is, the display apparatus 100 may provide explanation of the function of the display apparatus 100 via visual display of the display unit 180 and audio output of the audio output unit 185.

Next, the haptic output unit may output an alarm for the driver assistance function in a haptic manner. For example, the display apparatus 100 may output vibration to the user when a warning is included in at least one of navigation information, traffic information, communication information, vehicle state information, advanced driver assistance system (ADAS) function and other driver convenience information.

The haptic output unit may provide directional vibration. For example, the haptic output unit may be provided in a steering apparatus for controlling steering to output vibration. Left or right vibration may be output according to the left and right sides of the steering apparatus to enable directional haptic output.

In addition, the power supply 190 may receive power and supply power necessary for operation of the components under control of the processor 170. Lastly, the display apparatus 100 may include the processor 170 for controlling overall operation of the units of the display apparatus 100.

In addition, the processor 170 can control at least some of the components described with reference to FIG. 3 in order to execute the application program. Further, the processor 170 may operate by combining at least two of the components included in the display apparatus 100, in order to execute the application program.

The processor 170 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors 170, and electric units for the implementation of other functions.

The processor 170 may be controlled by the controller or can control various functions of the vehicle through the controller. The processor 170 can control overall operation of the display apparatus 100 in addition to operation related to the application programs stored in the memory 140. The processor 170 may process signals, data, information, etc. via the above-described components or execute the application programs stored in the memory 170 to provide appropriate information or functions to the user. An example in which the display apparatus 100 provides the virtual traffic signal will be described below in detail with reference to FIGS. 8 to 17.

Figure 8:
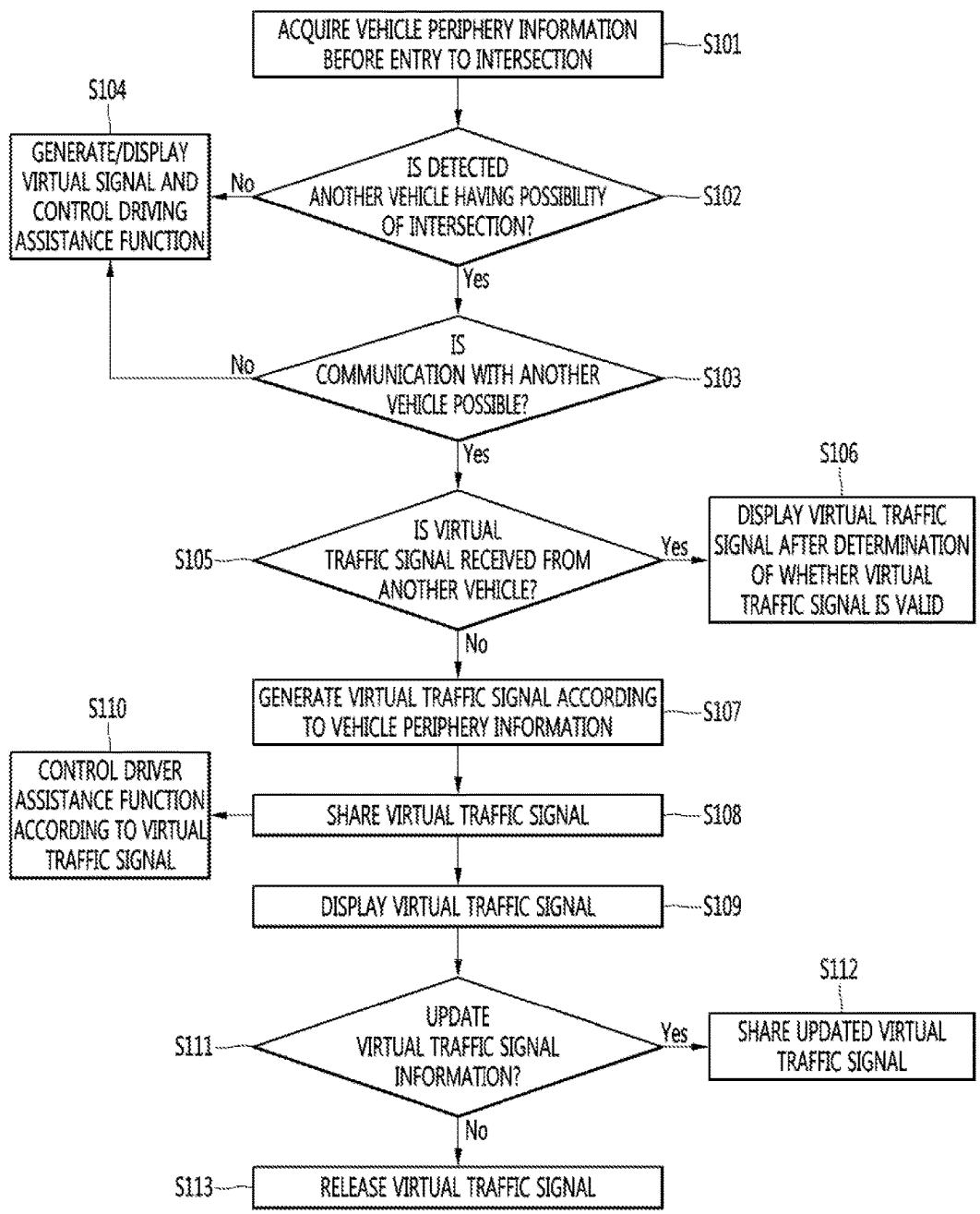
FIG. 8 is a flowchart of a method of providing a virtual traffic signal display function in a display apparatus according to an embodiment of the present invention.
Figure 9:
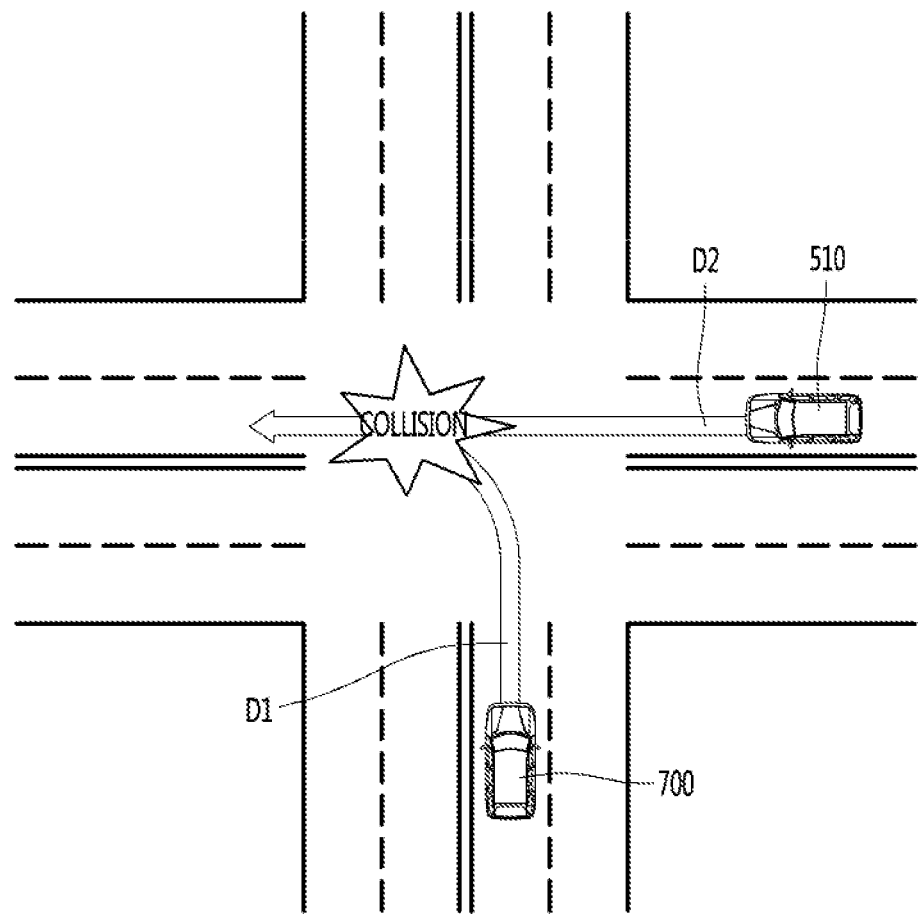
FIG. 9 is an example of a situation where a virtual traffic signal is generated.

Referring to FIG. 8, the display apparatus 100 may acquire vehicle periphery information before entry to an intersection (S101). Specifically, the display apparatus 100 may acquire the vehicle periphery information by collecting sensor information and communication information. Such vehicle periphery information may include at least one of a position of a host vehicle, a speed of the host vehicle, information on a route to a destination, a position relationship with a peripheral object, a movement direction of the object, information on a predicted movement route, and the like.

When it is detected from the vehicle periphery information that the host vehicle 700 has not yet entered the intersection and there is no traffic system (for example, signal light) at the intersection, the processor 170 may generate a virtual traffic signal and perform control such that display unit displays the virtual traffic signal.

In order to acquire the virtual traffic signal, the processor 170 may detect another vehicle 510 having a possibility of intersection from the vehicle periphery information (S102). Specifically, when the host vehicle is located in a predetermined distance from the another vehicle 510 and a predicted movement route of the host vehicle 700 overlaps a predicted movement route of the another vehicle 510, the processor 170 may detect the another vehicle 510 as having a possibility of intersection.

In another aspect, when a movement direction of the another vehicle 510 and a movement direction of the host vehicle 700 intersect with each other, the processor 170 may determine that there is a possibility of intersection. For example, referring to FIG. 9, the movement direction D1 of the host vehicle 700 driving on a road in a vertical direction is a left turn direction, and the movement direction D2 of the another vehicle 510 driving on a road in a horizontal direction is a straight direction, the predicted movement routes of the host vehicle 700 and the another vehicle 510 overlap each other at the intersection. Therefore, the another vehicle 510 has a possibility of intersection.

When the another vehicle 510 having the possibility of intersection is not detected before entry to the intersection, the processor 170 may generate a relevant virtual traffic signal and display the relevant virtual traffic signal through the display unit 180 (S103).

Specifically, it can be seen from FIG. 10A that there is a situation where the host vehicle 700 has not yet entered the intersection, the movement direction D1 thereof is a left turn direction, and there is no signal light at the intersection CS. When the processor 170 detects the above-described situation through vehicle periphery information, the processor 170 may generate a virtual traffic signal indicating permission of entry to the intersection and display the virtual traffic signal through the display unit 180.

Figure 10B:
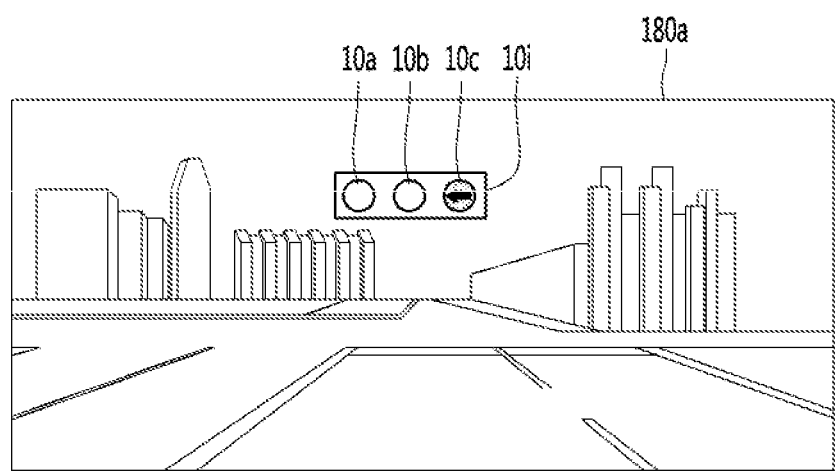
FIG. 10B is a diagram showing provision of a virtual traffic signal display function in the situation of FIG. 10A, according to an embodiment of the present invention.

For example, referring to FIG. 10B, a first display unit 180a may display an arrow-shaped blue light 10c indicating permission of a left turn in an activated state and the remaining lights 10a and 10b in a deactivated state as the virtual traffic signal 10i on the windshield.

Specifically, the first display unit 180a may brightly display an arrow icon 10c indicating a left-turn direction in blue color and darkly display the red light 10a and the yellow light 10b on the upper center of the windshield. A driver which has seen the virtual traffic signal 10i intuitionally recognizes that safe entry to the intersection is possible, thus achieving safe driving and preventing unnecessary deceleration before entry to the intersection. It is noted that, when there is a pedestrian having a possibility of intersection, the first display unit 180a may display the virtual traffic signal 10i in which the red right 10a is activated.

The processor 170 allows the host vehicle to pass through the intersection while broadcasting the generated virtual traffic signal 10i through the communication unit. Specifically, in the case of entry to an intersection with no traffic signal light, the processor 170 generates the virtual traffic signal 10i and provides the virtual traffic signal 10i to the driver. In addition, the processor 170 shares the virtual traffic signal 10i with peripheral vehicles, thus enabling driving according to the pre-agreed traffic signal and achieving safe driving and efficient traffic circulation.

Referring to the situation where there is another vehicle 510 having a possibility of intersection, the display apparatus 100 may attempt to communicate with the another vehicle 510 through the communication unit (S104). When there occurs a situation where communication with the another vehicle 510 is impossible through the communication unit, the processor 170 may generate the virtual traffic signal 10i, to which the situation is reflected, and display the virtual traffic signal 10i through the display unit 180.

Specifically, when it is detected that there is a possibility of intersection with the another vehicle 510 with which it is impossible to communicate, the processor 170 can perform control to generate and display a virtual traffic signal 10i indicating driving prohibition or driving caution in order for safe driving. For example, the first display unit 180a displays a red light 10a indicating driving prohibition in an activated state and the remaining lights in an deactivated state, inducing the driver to stop prior to entry to the intersection, and therefore, preventing collision with the another vehicle 510 in advance.

Further, the display apparatus 100 may receive the virtual traffic signal 10i from the another vehicle 510 before entry to the intersection (S105). Specifically, in the case of entry to the intersection, the display apparatus 100 may transmit the virtual traffic signal 10i indicating prohibition of entry to the intersection to other vehicles 510 each having a possibility of intersection.

Similarly, the display apparatus 100 may receive the virtual traffic signal 10i from the another vehicle 510 which has entered the intersection, before entry to the intersection. When receiving the virtual traffic signal 10i from the another vehicle 510, the display apparatus 100 may determine whether the virtual traffic signal 10i is valid, and display the received virtual traffic signal 10i (S106).

Figure 11:
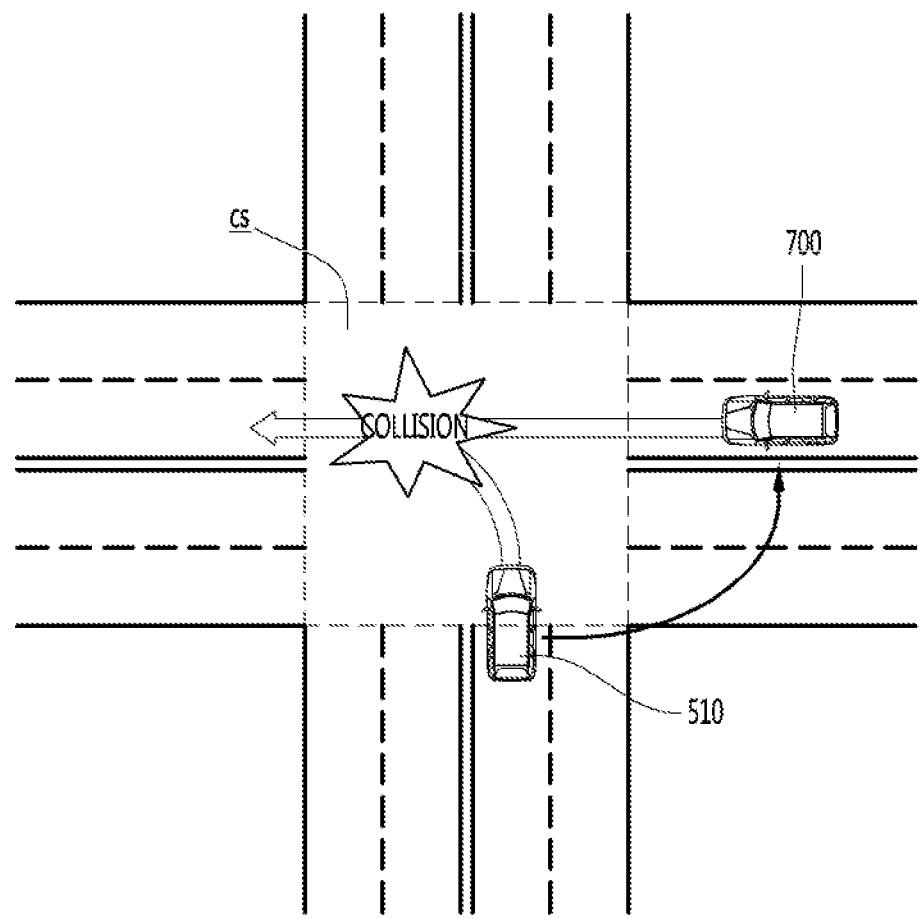
FIG. 11 is another example of a situation where a virtual traffic signal is provided.

Specifically, referring to FIG. 11, the vehicle 510, entered the intersection, may generate a virtual traffic signal 20i indicating driving prohibition and transmit the virtual traffic signal 20i to other vehicles 700 each having a possibility of intersection, which are located in the vicinity of the vehicle 510.

Figure 12:
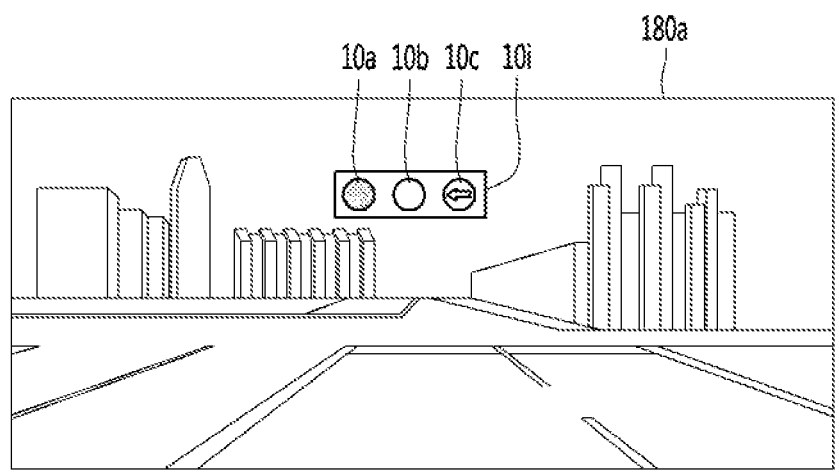
FIG. 12 is a diagram showing provision of a virtual traffic signal display function in the situation of FIG. 11, according to an embodiment of the present invention.

Referring to FIG. 12, the vehicle 700, which has received the virtual traffic signal 10i from the another vehicle 510 entered the intersection, displays the virtual traffic signal 10i indicating prohibition of entry to the intersection, thus sharing the pre-agreed traffic signal and enabling driving according to the pre-agreed traffic signal.

When a plurality of vehicles have not yet entered the intersection and communication therebetween is possible, the display apparatus 100 may acquire a virtual traffic signal according to vehicle periphery information (S107). In addition, the display apparatus 100 may share the virtual traffic signal with the another vehicle 510 having a possibility of intersection (S108).

Specifically, the host vehicle 700 and the another vehicle 510 may generate a virtual traffic signal together while sharing driving information with each other. The host vehicle 700 may receive the virtual traffic signal generated by the another vehicle 510. Alternatively, the host vehicle 700 may directly generate a virtual traffic signal and transmit the virtual traffic signal to the another vehicle 510. In this way, the virtual traffic signal is shared by the host vehicle 700 and the another vehicle 510, thus allowing acquirement of the virtual traffic signal.

A description will be given by taking an example where the host vehicle 700 directly generates a virtual traffic signal and transmits the virtual traffic signal to the another vehicle 510. When it is detected that the host vehicle 700 and the another vehicle 510 have not yet entered the intersection and there is a possibility that the host vehicle 700 and the another vehicle 510 intersect each other, the processor 170 may generate a virtual traffic signal according to the vehicle periphery information.

In this instance, when communication with the another vehicle 510 is possible, the processor 170 may generate a virtual traffic signal for performing control such that one of the host vehicle 700 and the another vehicle 510 displays a virtual traffic signal in which a blue light is activated, and the other of the host vehicle 700 and the another vehicle 510 displays a virtual traffic signal in which a red light is activated.

That is, the processor 170 generates the virtual traffic signal for instructing one of the host vehicle 700 and the another vehicle 510 to stop before entry to the intersection, and the other to pass through the intersection and perform control such that the host vehicle 700 and the another vehicle 510 both display the virtual traffic signal, preventing a vehicle accident and enhancing traffic efficiency.

For example, the processor 170 calculates which of the another vehicle 510 and the host vehicle 700 first reaches an intersection area, and performs control such that a vehicle to first reach the intersection area displays a virtual traffic signal in which a blue light is activated and the remaining vehicle displays a virtual traffic signal in which a red light is activated.

When there is no possibility of collision between the another vehicle 510 and the host vehicle 700 even in the case of entry to the intersection, the another vehicle 510 and the host vehicle 700 both may display the virtual traffic signal in which the blue light is activated, thus enhancing traffic efficiency.

For example, when there is no possibility of collision since a driving direction of the another vehicle 510 and a driving direction of the host vehicle 700 do not intersect with each other, the host vehicle 700 may receive the driving information of the another vehicle 510 and generate and display a signal in which a blue light is activated as a virtual signal of the host vehicle 700. Also, the host vehicle 700 may transmit information such that the another vehicle 510 displays a signal in which a blue light is activated.

That is, the host vehicle 700 generates a virtual signal according to the driving direction of the host vehicle 700 and the driving directions of peripheral vehicles and the virtual signal to the peripheral vehicles while entering an intersection. The peripheral vehicles 510 individually display their virtual signals according to their possibilities of collision with the host vehicle 700, thus achieving optimization of traffic efficiency at the intersection.

Figure 13A:
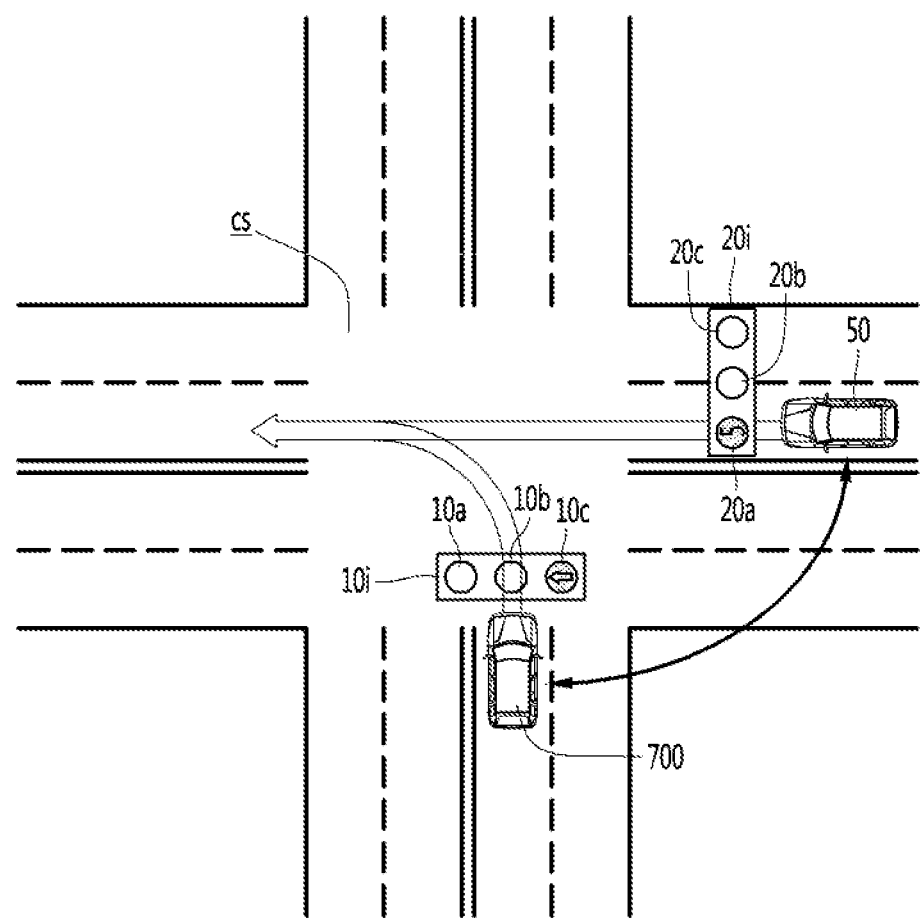
FIG. 13A is another example of a situation where a virtual traffic signal is provided.

It can be seen from FIG. 13A that, since the host vehicle 700 is scheduled to drive in a left-turn direction and the another vehicle 510 is scheduled to drive straight in a horizontal direction, there is a possibility of intersection between the host vehicle 700 and the another vehicle 510 and the host vehicle 700 is closer to the intersection than the another vehicle 510.

The processor 170 may detect the above-described situation from the vehicle periphery information and perform control such that the host vehicle 700 displays a virtual traffic signal 10i in which a blue light 10c indicating permission of left-turn driving is activated and the another vehicle 510 displays a virtual traffic signal 20i in which a red light 10a indicating prohibition of entry to the intersection is activated.

Figure 13B:
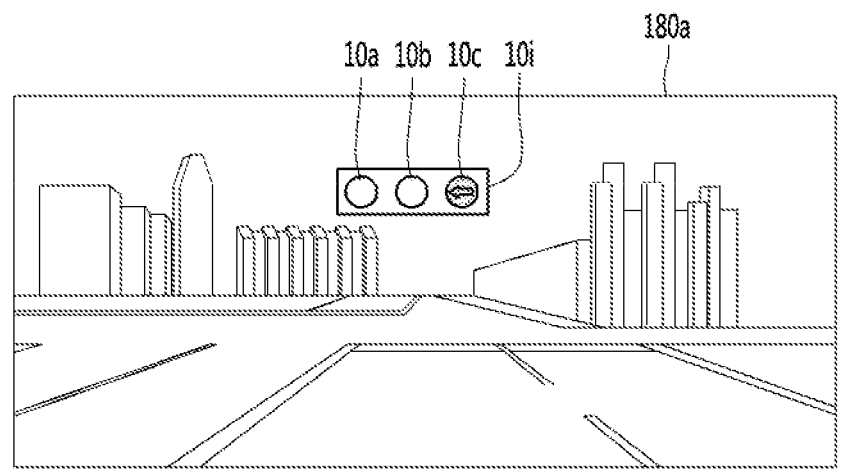
FIG. 13B is a diagram showing provision of a virtual traffic signal display function to a host vehicle in the situation of FIG. 13A.

Therefore, referring to FIG. 13B, the first display unit 180a of the host vehicle 700 may display a virtual traffic signal 10i indicating permission of left-turn driving. In this instance, the first display unit 180a may display a driving direction along with the signal indicating permission of left-turn driving, thus allowing a driver to be convinced that left-turn driving is safe.

Figure 13C:
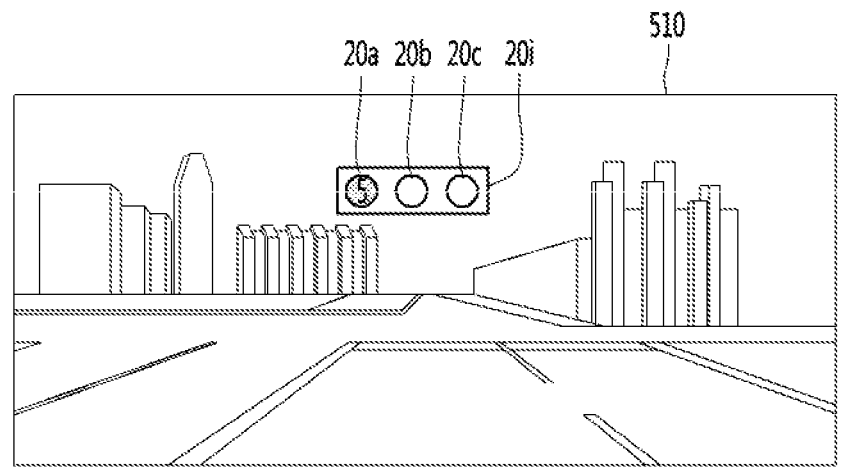
FIG. 13C is a diagram showing provision of a virtual traffic signal display function to another vehicle in the situation of FIG. 13A.

Referring to FIG. 13C, the another vehicle 510 may receive the virtual traffic signal and display the virtual traffic signal 20i in which the red light indicating prohibition of entry to the intersection is activated on the windshield. In this instance, the display unit 510 of the another vehicle 510 may also display a waiting time, thus helping the driver in predicting a time during which the vehicle stops.

That is, the processor 170 may further include a driving prohibition time, a driving prohibition reason, a movement direction in which driving is permitted, in the virtual traffic signal, in addition to driving caution, driving prohibition, and driving permission. Further, the display apparatus 100 can control a driver assistance function according to the virtual traffic signal (S110).

For example, the processor 170 can control the ISG function based on the virtual traffic signal. Specifically, when the processor 170 checks information on driving prohibition and information on a driving waiting time from the virtual traffic signal, the processor 170 can control the ISG function in such a way to stop an engine of the vehicle during the driving waiting time.

Further, the display apparatus 100 may periodically update the virtual traffic signal according to a change in the vehicle periphery information (S111). The display apparatus 100 may share the updated virtual traffic signal with the another vehicle 510 (S112).

Figure 14:
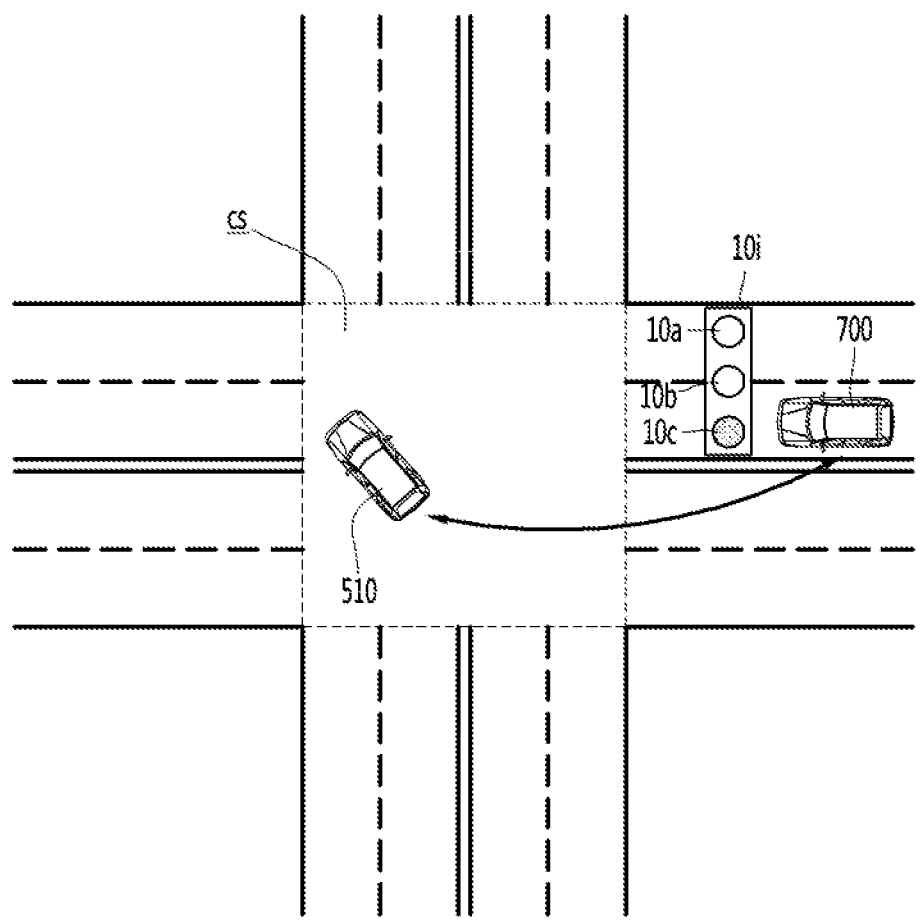
FIG. 14 is an example of a situation where a virtual traffic signal is updated according to an embodiment of the present invention.

Specifically, referring to FIG. 14, when an estimated time taken to pass-through the intersection increases after the host vehicle 700 turns left and enters the intersection, the processor 170 may generate a virtual traffic signal 10i having an increased driving waiting time and transmit the virtual traffic signal to the another vehicle 510. Therefore, an estimated waiting time of the virtual traffic time 10i displayed on the windshield of the another vehicle 510 may be increased and displayed.

The display apparatus 100 may release the virtual traffic signal when no other vehicle 510 having a possibility of intersection is detected from the vehicle periphery information (S113). That is, the first display unit 180a may not display the virtual traffic signal any more.

As describe above, the display apparatus 100 may generate and provide a virtual traffic signal or the like, which is pre-agreed between vehicles having a possibility of intersection at the intersection, preventing collision between vehicles and achieving smooth traffic flow at the intersection. Further, the virtual traffic signal display function may be also provided in driving situations, such as entry to a highway, lane change, escape from a highway, or entry to a bottleneck.

Figure 15:
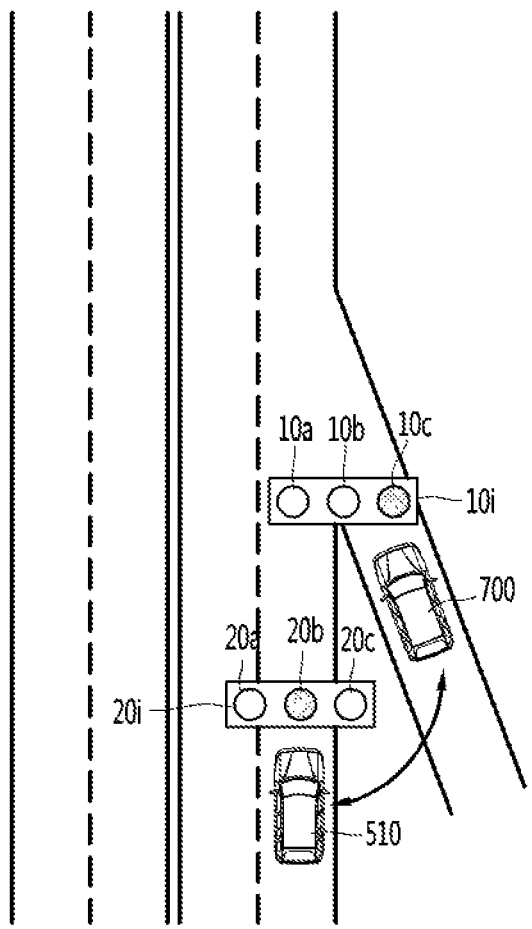
FIGS. 15 to 17 are diagrams showing various examples in which a virtual traffic signal display function according to an embodiment of the present invention is provided.

Referring to FIG. 15, the host vehicle 700 is entering a highway, and the another vehicle 510 is driving on a lane which the host vehicle 700 is scheduled to enter. When the display apparatus 100 determines that the another vehicle 510 is driving on a lane which the host vehicle 700 is scheduled to enter, based on the vehicle periphery information, the display apparatus 100 may determine the another vehicle 510 as having a possibility of intersection and generate a virtual traffic signal.

Specifically, the processor 170 may calculate which of the host vehicle 700 and the another vehicle 510 first reaches an intersection area. In addition, the processor 170 can perform control such that a vehicle to first reach the intersection area generates a virtual traffic signal 10i in which a blue light indicating driving permission is activated.

Also, the processor 170 can perform control such that a vehicle to reach the intersection area later generates a virtual traffic signal 20i in which a yellow light 20b indicating instruction of deceleration is activated and performs sharing of the virtual traffic signal 20i through communication. When a speed of the host vehicle 700 is equal to or less than a predetermined speed, the processor 170 can perform control such that the another vehicle 510 displays the virtual traffic signal 20i in which the red light 20a indicating driving prohibition is activated.

Therefore, the virtual traffic signal 10i in which the blue light 10c indicating permission of entry to the highway is activated may be displayed on the windshield of the host vehicle 700 and the virtual traffic signal 20i in which the yellow light 20b indicating driving caution is activated may be displayed on the windshield of the another vehicle 510.

Therefore, a driver of the host vehicle 700 performs safe entry to a corresponding lane of the highway without deceleration and a driver of the another vehicle 510 performs driving against the host vehicle 700 in advance.

Figure 16:
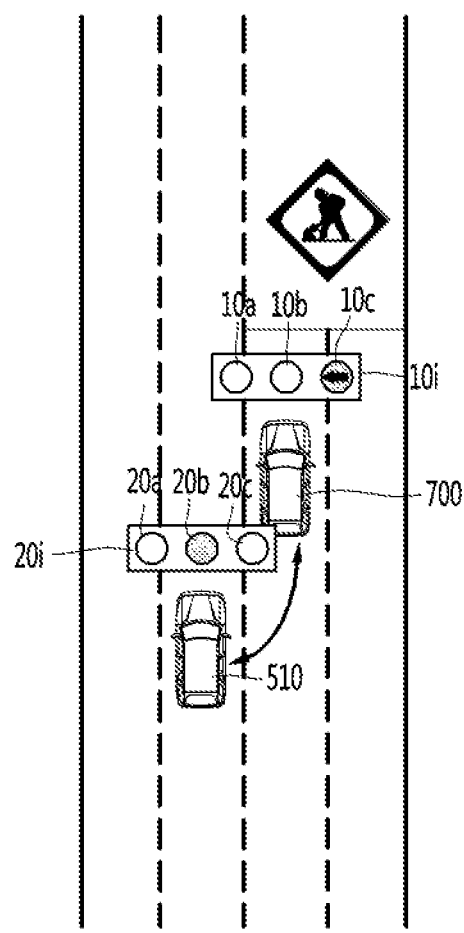

Referring to FIG. 16, there illustrated a situation where, since a lane on which the host vehicle 700 is driving is under the construction, the host vehicle 700 needs to perform lane change to a next lane. When it is checked that the host vehicle 700 is driving on a bottleneck section where a lane disappears, the display apparatus 100 may determine the another vehicle 510 driving behind the host vehicle 700 on the lane for lane change as having a possibility of intersection and generate a virtual traffic signal.

Specifically, the processor 170 may calculate which of the host vehicle 700 and the another vehicle 510 first reaches an intersection area. The processor 170 can perform control such that a vehicle to first reach the intersection area generates a virtual traffic signal in which a blue light indicating driving permission is activated.

Also, the processor 170 can perform control such that a vehicle to reach the intersection area later generates a virtual traffic signal 20i in which a yellow light indicating instruction of deceleration is activated and performs sharing of the virtual traffic signal 20i through communication.

When the speed of the host vehicle 700 is equal to or less than a predetermined speed, the processor 170 can perform control such that the another vehicle 510 displays a virtual traffic signal in which a red light indicating driving prohibition is activated.

Therefore, the virtual traffic signal 10i in which the blue light 10c indicating permission of lane change is activated may be displayed on the windshield of the host vehicle 700 and the virtual traffic signal 20i in which the yellow light 20b indicating driving caution is activated may be displayed on the windshield of the another vehicle 510. Therefore, a driver of the host vehicle 700 performs safe lane change without unnecessary deceleration and a driver of the another vehicle 510 performs driving against the host vehicle 700 in advance.

Figure 17:
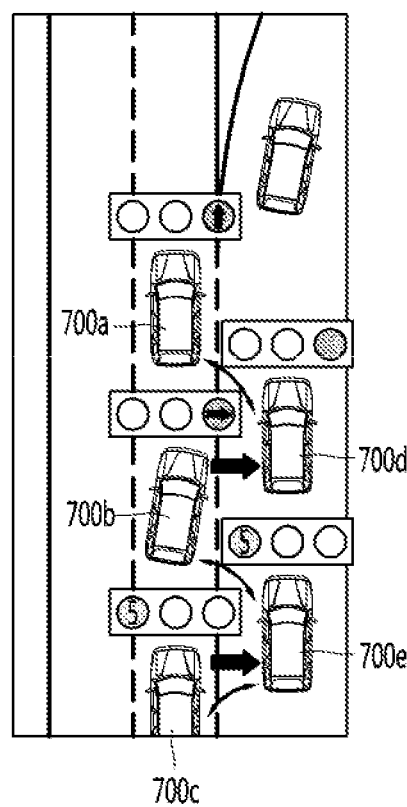

Referring to FIG. 17, even in a driving section in which a plurality of vehicles 700a, 700b, 700c, 700d and 700e need to negotiate with one another, the virtual traffic signal display function may be provided. That is, it is possible to generate a virtual traffic signal which is agreed by the vehicles 700a, 700b, 700c, 700d, 700e adjacent to one another through communication and perform sharing of the virtual traffic signal, thus achieving safe and smooth driving.

An embodiment in which a virtual traffic signal is provided in a situation where there is a traffic signal will be described in detail below with reference to FIGS. 18 to 23.

Figure 18:
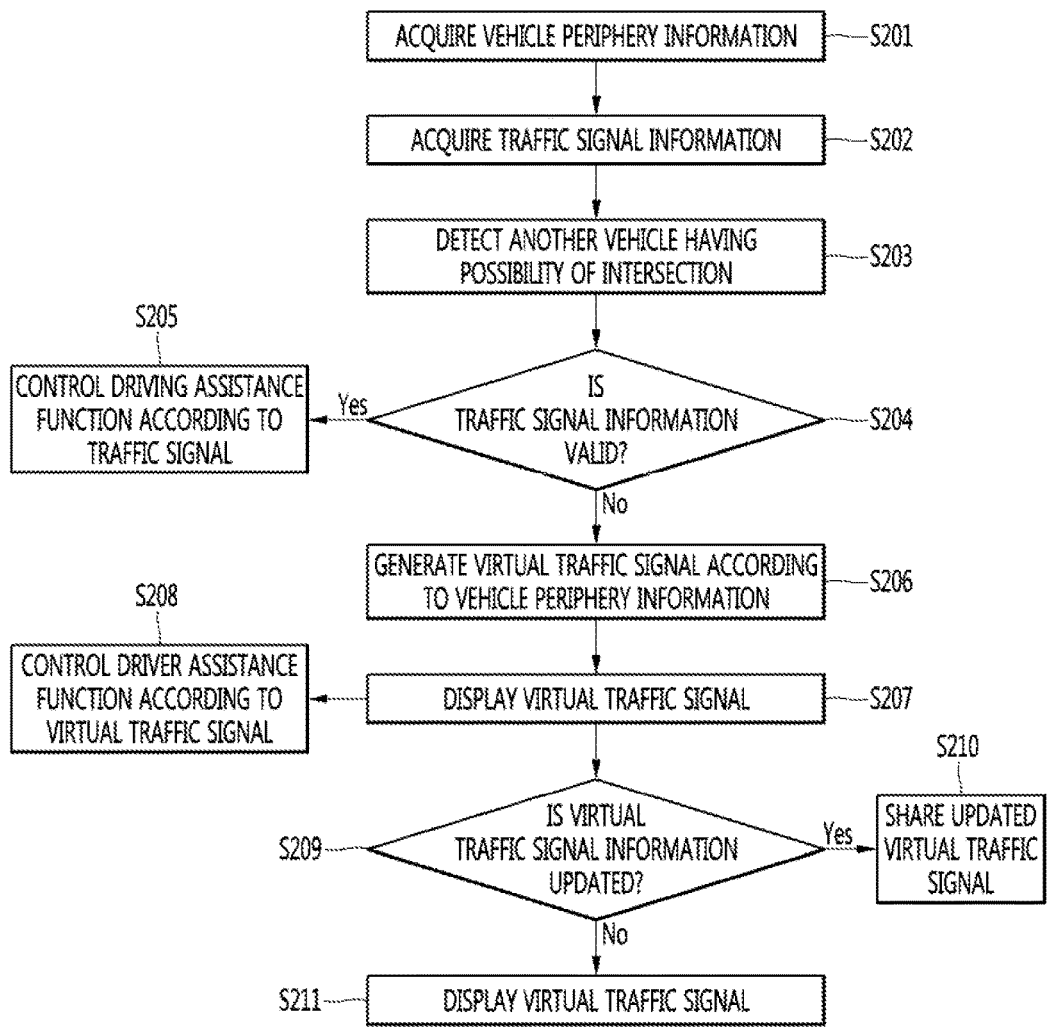
FIG. 18 is a flowchart of a method of providing a virtual traffic signal display function in a display apparatus according to an embodiment of the present invention in a situation
Figure 19:
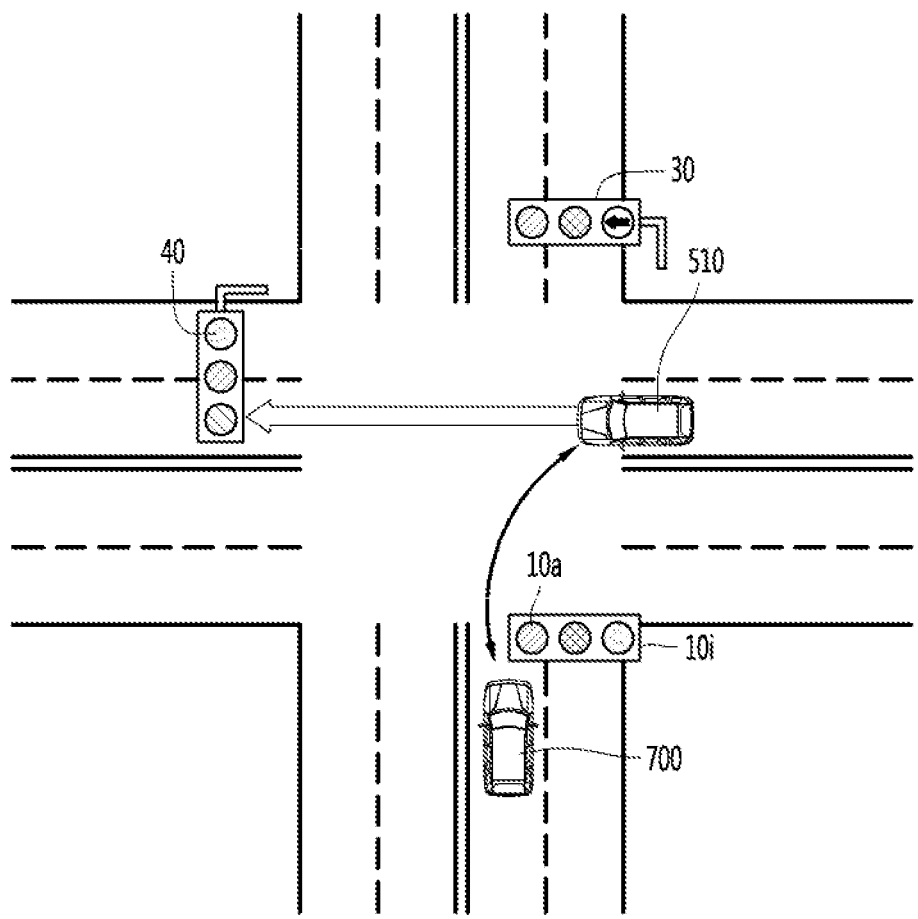
FIG. 19 is another example of a situation where a virtual traffic signal display function is provided.

Referring to FIG. 18, the display apparatus 100 may acquire vehicle periphery information (S201).

Specifically, the display apparatus 100 may acquire the vehicle periphery information by collecting sensor information and communication information. Such vehicle periphery information may include at least one of traffic signal information, a position of the host vehicle 700, a speed of the host vehicle 700, information on a route to a destination, a position relationship with a peripheral object, a movement direction of the object, information on a predicted movement route, and the like.

The processor 170 may acquire traffic signal information from the vehicle peripheral information (S202). Specifically, the processor 170 may acquire the traffic signal information by capturing a traffic signal light through the camera 160 and performing image processing on a captured image.

Also, the processor 170 may acquire the traffic signal information by receiving the traffic signal information from a road side unit (RSU) through the communication unit 110. The display apparatus 100 may detect another vehicle 510 having a possibility of intersection from the vehicle periphery information (S203).

Next, the processor 170 may determine whether the acquired traffic signal information is valid (S204). For example, the processor 170 may determine whether the traffic signal information is valid based on the vehicle periphery information. Specifically, when the traffic signal information indicates permission of driving of host vehicle 700 and there is the another vehicle 150 having a possibility of intersection, the processor 170 may determine that the traffic signal is invalid because there is a possibility of collision.

When the traffic signal is valid, the processor 170 can control a driving assistance function according to the traffic signal (S205). Specifically, the processor 170 may provide an ISG function for shutting down an engine during a driving waiting time of the traffic signal information.

When the traffic signal information is invalid, the processor 170 may generate a virtual traffic signal according to the vehicle periphery information (S206). In addition, the processor 170 can perform control so as to display the generated virtual traffic signal (S207).

Specifically, the processor 170 may generate a virtual traffic signal to indicate information opposite to the acquired traffic signal information. For example, referring to FIG. 19, a traffic signal 30 for the host vehicle 700 indicates that an arrow-shaped blue light indicating permission of left-turn driving is activated and a traffic signal 40 for the another vehicle 510 indicates that a red light indicating driving prohibition is activated. In addition, the another vehicle 510 is driving straight in a horizontal direction while violating a traffic signal, so that there is a possibility of intersection between the host vehicle 700 which is turning left and the another vehicle 510.

Therefore, the processor 170 may determine that the traffic signal 30, which indicates driving permission in spite of the another vehicle 510 having a possibility of intersection, is invalid, and generate a virtual traffic signal 10*i* indicating driving prohibition.

Figure 20A:
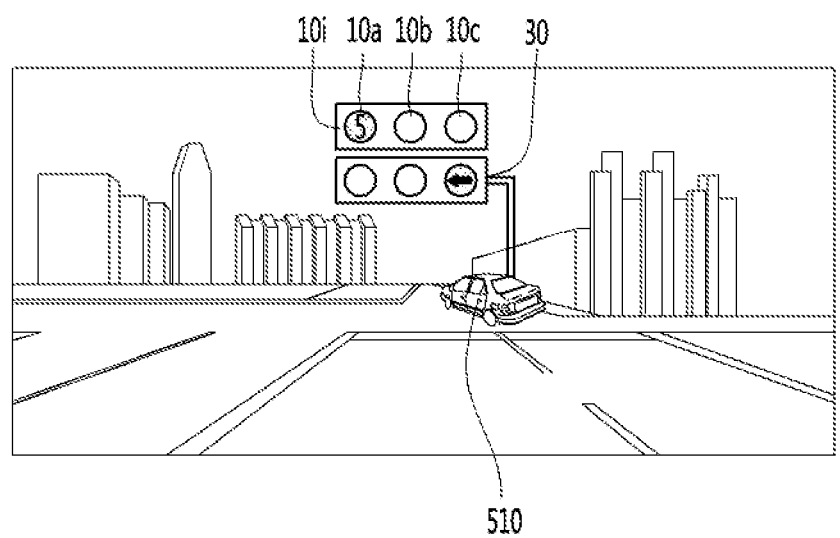
FIG. 20A is a diagram showing one example of provision of a virtual traffic signal display function to a host vehicle in the situation of FIG. 19.

Specifically, referring to FIG. 20A, the first display unit 180*a* may display the virtual traffic signal 10*i* indicating driving prohibition in the vicinity of a region to which the traffic signal 30 is projected on the windshield. Therefore, it is possible to previously prevent risk of collision which may occur when a driver checks only the traffic signal and drives the vehicle on confidence in the traffic signal.

Figure 20B:
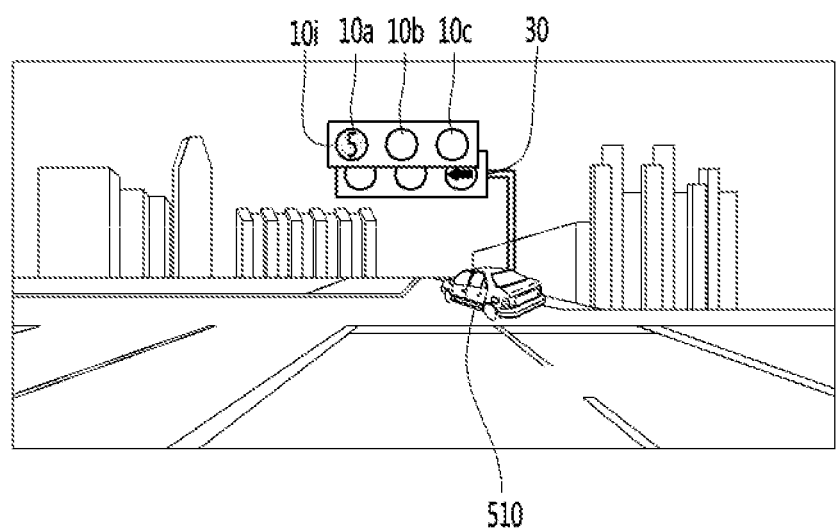
FIG. 20B is a diagram showing another example of provision of a virtual traffic signal display function to a host vehicle in the situation of FIG. 19.

Also, referring to FIG. 20B, the first display unit 180*a* may display the virtual traffic signal 10*i* indicating driving prohibition to overlap the region to which the traffic signal 30 is projected on the windshield. That is, the display apparatus 100 prevents the driver from seeing the traffic signal that is determined as being invalid, thus preventing the risk of collision in advance.

Further, the display apparatus 100 can control a driver assistance function according to the virtual traffic signal (S208). For example, the processor 170 can control the ISG function based on the virtual traffic signal. Specifically, the processor 170 can control the ISG function in such a way to shut down an engine during a driving waiting time when information indicating driving prohibition and information on the driving waiting time are checked from the virtual traffic signal.

Further, the display apparatus 100 may periodically update the virtual traffic signal according to a change in the vehicle periphery information (S209). The display apparatus 100 may share the updated virtual traffic signal with the another vehicle 510 (S210).

Subsequently, the display apparatus 100 may release the virtual traffic signal when no other vehicle 510 having a possibility of intersection is detected from the vehicle periphery information (S211). That is, the first display unit 180*a* may not display the virtual traffic signal any more.

As described above, the display apparatus 100 may generate and display a virtual traffic signal when a traffic signal is invalid, thus preventing collision between vehicles and achieving smooth traffic flow at the intersection.

Various examples in which the virtual traffic signal is provided will now be described. The display apparatus 100 may provide a virtual traffic signal even when the another vehicle 510 does not violate a traffic signal.

Figure 21:
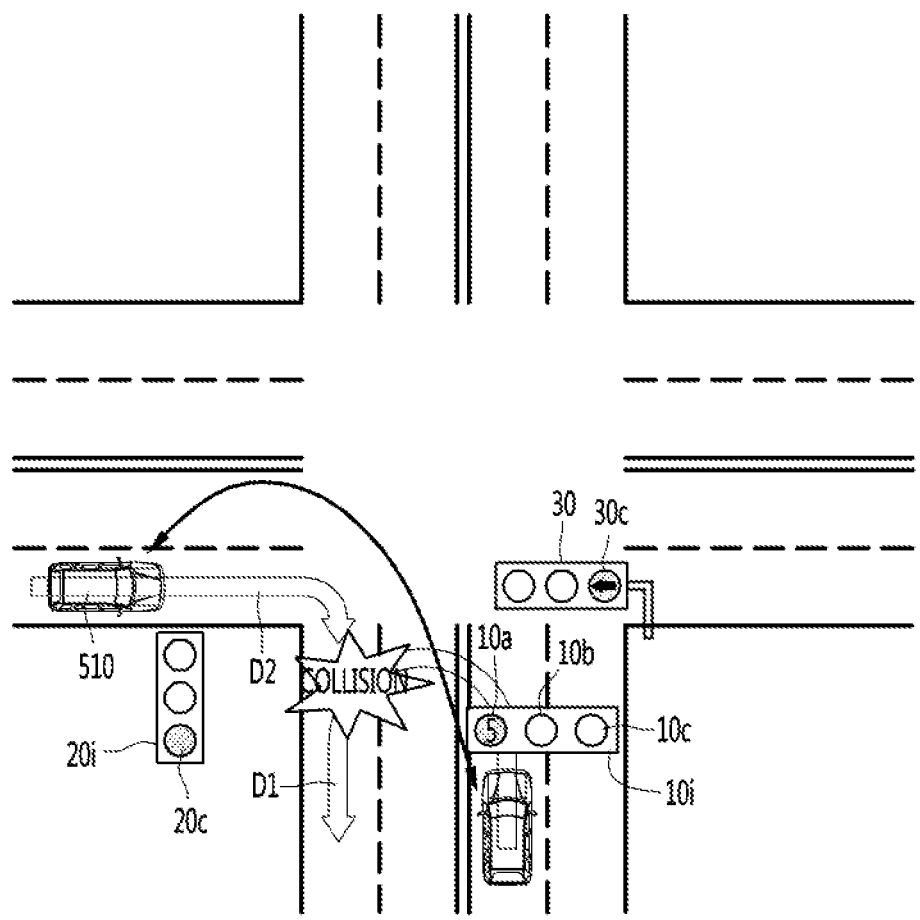
FIGS. 21 to 23B are diagrams showing various examples in which a virtual traffic signal display function according to an embodiment of the present invention is provided.

Referring to FIG. 21, the another vehicle 510 is in a state of capable of turning right (D2), and the host vehicle 700 is in a state of capable of performing a U-turn. When the another vehicle 510 and the host vehicle 700 drive together, the another vehicle 510 and the host vehicle 700 may intersect with each other, thus causing risk of collision.

Therefore, the display apparatus 100 may determine a vehicle to first reach an intersection area and generate a virtual traffic signal. Specifically, when it is determined that the another vehicle 510 is capable of first entering the intersection area, the processor 170 performs control to transmit a virtual traffic signal 20*i* indicating driving permission to the another vehicle 510 and display a virtual traffic signal 10*i* indicating prohibition of U-turn driving on the windshield of the host vehicle 700.

Further, the display apparatus 100 is provided in a special vehicle to perform assistance such that the special vehicle rapidly reaches a destination in an emergency situation.

Figure 22A:
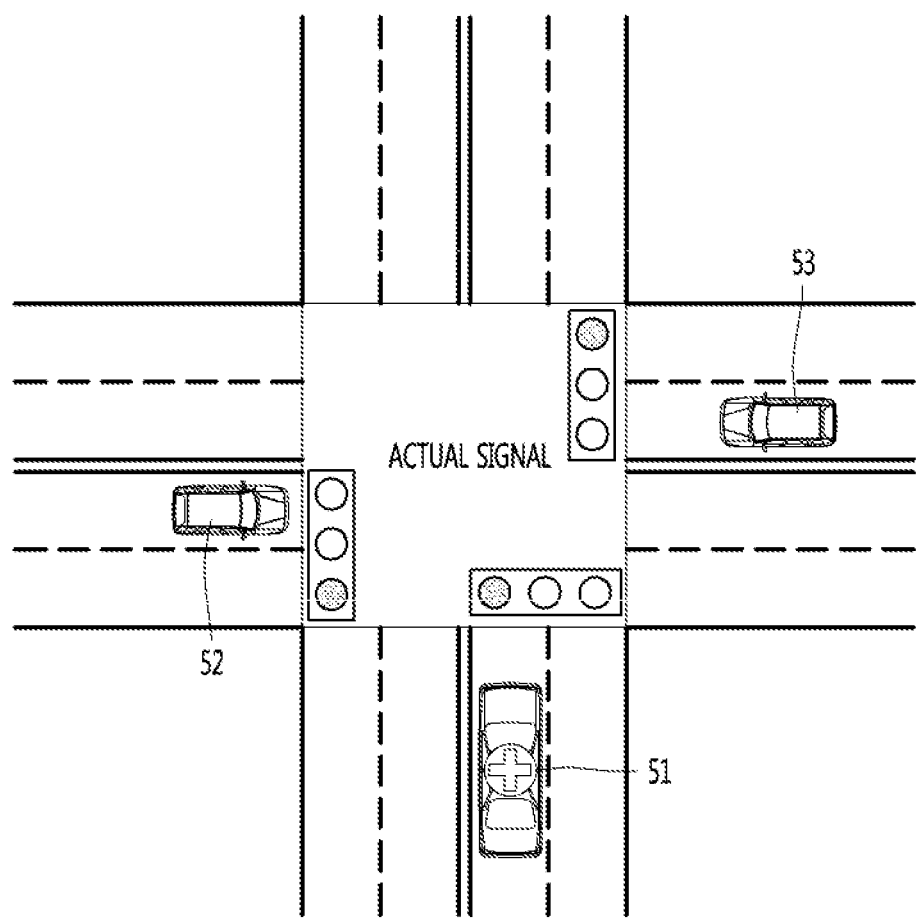

Referring to FIG. 22A, there illustrated a situation where a traffic signal light indicates driving prohibition with respect to a first vehicle 51 that is a special vehicle and indicates driving permission with respect to a second vehicle 52 and a third vehicle 53.

Figure 22B:
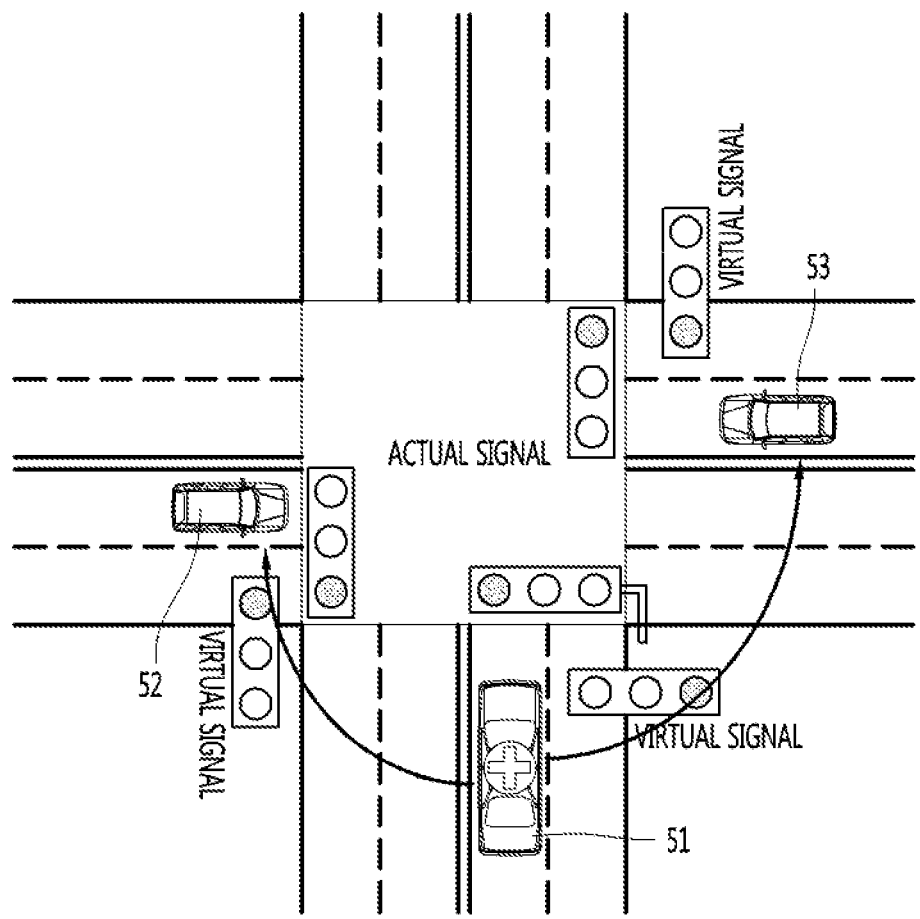

Referring to FIG. 22B, in an emergency situation, the display apparatus 100 of the first vehicle 51 transmits a virtual traffic signal indicating driving prohibition to vehicles in the vicinity of the first vehicle 51 and performs control such that the second vehicle 52 and the third vehicle 53 display the virtual traffic signal indicating driving permission on the windshield when communication with the second vehicle 52 and the third vehicle 53 is possible. Further, the display apparatus 100 may provide the virtual traffic signal display function to vehicles behind and ahead of a host vehicle in a driving direction.

Figure 23A:
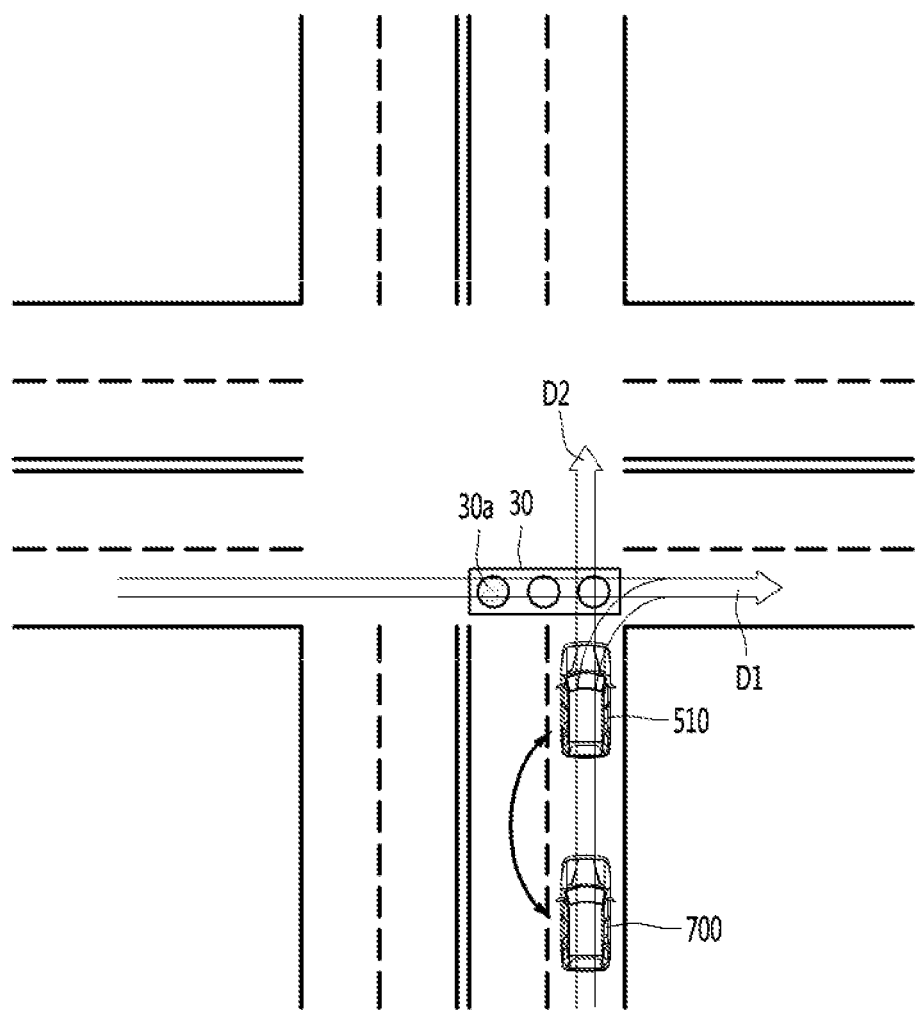
Figure 23B:
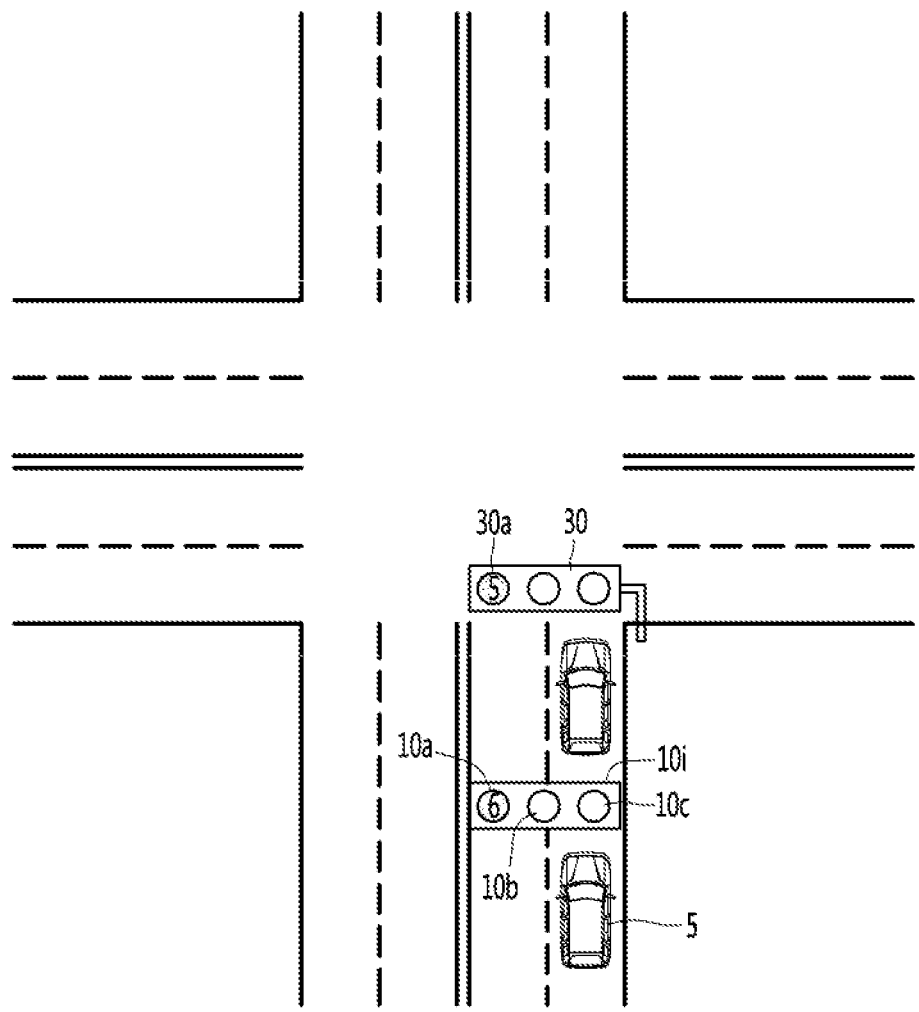

Referring to FIG. 23A, the host vehicle 700 intends to turn right and a vehicle ahead intends to drive straight. In this instance, a traffic signal 30 indicates prohibition of straight driving, so that the host vehicle 700 cannot turn right. Referring to FIG. 23B, since the vehicle ahead cannot drive straight, the vehicle ahead may transmit a virtual traffic signal 10*i* indicating prohibition of turn-right driving. The host vehicle 700, received the virtual traffic signal 10*i*, may display the virtual traffic signal 10*i* indicating prohibition of turn-right driving on the windshield. In this instance, a waiting time for driving prohibition may be a time obtained by adding a predetermined time to a time at which straight driving becomes possible.

As described above, the display apparatus 100 generates and provides an appropriate virtual traffic signal according to various situations, thus achieving safe driving and enhancing traffic efficiency and driver convenience.

Figure 24:
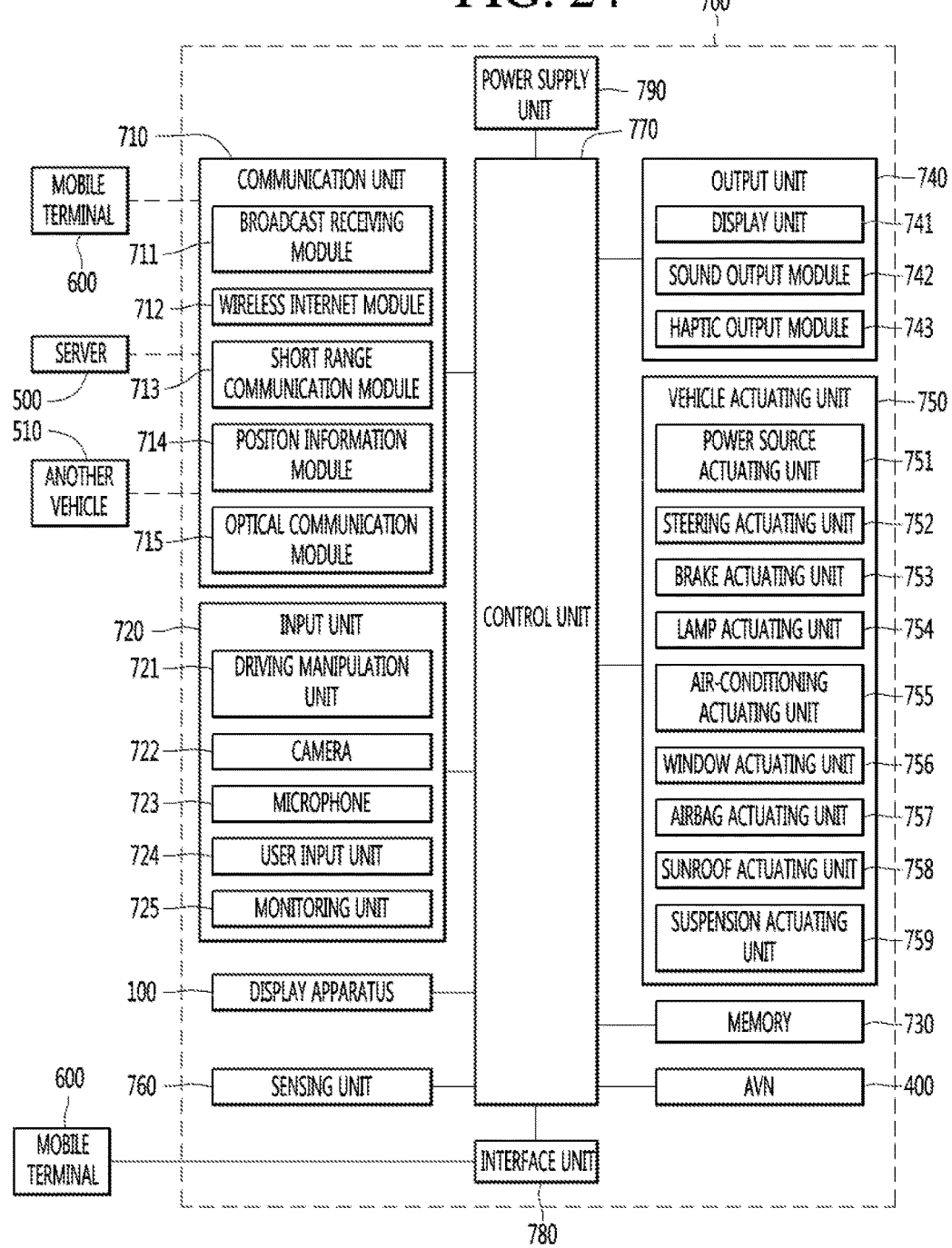
FIG. 24 is a block diagram showing the internal configuration of the vehicle having the display apparatus.

Referring to the FIG. 24, the above-described display apparatus 100 may be included in the vehicle 700. The vehicle 700 may include a communication unit 710, an input unit 720, a sensing unit 760, an output unit 740, a vehicle drive unit 750, a memory 730, an interface 780, a controller 770, a power supply unit 790, a display apparatus 100 and AVN apparatus 400. Here, among the units included in the display apparatus 100 and the units of the vehicle 700, the units having the same names are described as being included in the vehicle 700.

The communication unit 710 may include one or more modules which permit communication such as wireless communication between the vehicle and the mobile terminal 600, between the vehicle and the external server 50 or between the vehicle and the other vehicle 510. Further, the communication unit 710 may include one or more modules which connect the vehicle to one or more networks.

The communication unit 710 includes a broadcast receiving module 711, a wireless Internet module 712, a short-range communication module 713, and an optical communication module 715. The broadcast reception module 711 receives a broadcast signal or broadcast related information from an external broadcast management server through a broadcast channel. Here, the broadcast includes a radio broadcast or a TV broadcast.

The wireless Internet module 712 refers to a wireless Internet access module and may be provided inside or outside the vehicle. The wireless Internet module 712 transmits and receives a wireless signal through a communication network according to wireless Internet access technologies.

Examples of such wireless Internet access technologies include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (IISDPA), IISUPA (High Speed Uplink Packet Access), Long Term Evolution (LTE), LTE-A (Long Term Evolution-Advanced), and the like. The wireless Internet module 712 may transmit/receive data according to one or more of such wireless Internet technologies, and other Internet technologies as well. For example, the wireless Internet module 712 may wirelessly exchange data with the external server 500. The wireless Internet module 712 may receive weather information and road traffic state information (e.g., transport protocol experts group (TPEG) information) from the external server 500.

The short-range communication module 713 is configured to facilitate short-range communication. Such short-range communication may be supported using at least one of Bluetooth™, Radio Frequency Identification (RFID), Infrared Data Association (IrDA), Ultra-Wideband (UWB), ZigBee, Near Field Communication (NFC), Wireless-Fidelity (Wi-Fi), Wi-Fi Direct, Wireless USB (Wireless Universal Serial Bus), and the like.

The short-range communication module 713 may form a wireless local area network to perform short-range communication between the vehicle and at least one external device. For example, the short-range communication module 713 may wirelessly exchange data with the mobile terminal 600. The short-range communication module 713 may receive weather information and road traffic state information (e.g., transport protocol experts group (TPEG) information) from the mobile terminal 600. When a user rides in the vehicle, the mobile terminal 600 of the user and the vehicle may pair with each other automatically or by executing the application of the user.

A location information module 714 acquires the location of the vehicle and a representative example thereof includes a global positioning system (GPS) module. For example, the vehicle may acquire the location of the vehicle using a signal received from a GPS satellite upon utilizing the GPS module.

The optical communication module 715 may include a light emitting unit and a light reception unit. The light reception unit may convert a light signal into an electric signal and receive information. The light reception unit may include a photodiode (PD) for receiving light. The photodiode may covert light into an electric signal. For example, the light reception unit may receive information on a preceding vehicle through light emitted from a light source included in the preceding vehicle.

The light emitting unit may include at least one light emitting element for converting electrical signals into a light signal. Here, the light emitting element may be a Light Emitting Diode (LED). The light emitting unit converts electrical signals into light signals to emit the light. For example, the light emitting unit may externally emit light via flickering of the light emitting element corresponding to a prescribed frequency. In some embodiments, the light emitting unit may include an array of a plurality of light emitting elements. In some embodiments, the light emitting unit may be integrated with a lamp provided in the vehicle. For example, the light emitting unit may be at least one selected from among a headlight, a taillight, a brake light, a turn signal, and a sidelight. For example, the optical communication module 715 may exchange data with the other vehicle 510 via optical communication.

The input unit 720 may include a driving operation unit 721, a camera 195, a microphone 723 and a user input unit 724. The driving operation unit 721 receives user input for driving of the vehicle (see FIG. 2). The driving operation unit 721 may include a steering input unit 721A, a shift input unit 721D, an acceleration input unit 721C and a brake input unit 721B.

The steering input unit 721A is configured to receive user input with regard to the direction of travel of the vehicle. The steering input unit 721A may include a steering wheel using rotation. In some embodiments, the steering input unit 721A may be configured as a touchscreen, a touch pad, or a button.

The shift input unit 721D is configured to receive input for selecting one of Park (P), Drive (D), Neutral (N), and Reverse (R) gears of the vehicle from the user. The shift input unit 721D may have a lever form. In some embodiments, the shift input unit 721D may be configured as a touchscreen, a touch pad, or a button.

The acceleration input unit 721C is configured to receive input for acceleration of the vehicle from the user. The brake input unit 721B is configured to receive input for speed reduction of the vehicle from the user. Each of the acceleration input unit 721C and the brake input unit 721B may have a pedal form. In some embodiments, the acceleration input unit 721C or the brake input unit 721B may be configured as a touchscreen, a touch pad, or a button.

The camera 722 may include an image sensor and an image processing module. The camera 722 may process a still image or a moving image obtained by the image sensor (e.g., CMOS or CCD). In addition, the image processing module processes the still image or the moving image acquired through the image sensor, extracts necessary information, and delivers the extracted information to the controller 770. The vehicle may include the camera 722 for capturing the front image of the vehicle or the image of the vicinity of the vehicle and the monitoring unit 725 for capturing the image of the space inside the vehicle.

The monitoring unit 725 may acquire an image of a passenger. The monitoring unit 725 may acquire an image for biometric information of the passenger. Although the monitoring unit 725 and the camera 722 are included in the input unit 720 in FIG. 24, the camera 722 may be included in the display apparatus 100 as described above.

The microphone 723 may process external sound signals into electrical data. The processed data may be utilized in various ways according to a function that the vehicle is performing. The microphone 723 may convert a user voice command into electrical data. The converted electrical data may be transmitted to the controller 770.

Meanwhile, in some embodiments, a camera 722 or the microphone 723 may not be included in the input unit 720 but may be included in the sensing unit 760. The user input unit 724 is configured to receive information from the user. When information is input via the user input unit 724, the controller 770 can control the operation of the vehicle to correspond to the input information. The user input unit 724 may include a touch input unit or a mechanical input unit. In some embodiments, the user input unit 724 may be located in a region of the steering wheel. In this instance, the driver may operate the user input unit 724 with the fingers while gripping the steering wheel.

The sensing unit 760 is configured to sense signals associated with, for example, signals related to driving of the vehicle. Thus, the sensing unit 760 may include a collision sensor, a wheel sensor, a speed sensor, tilt sensor, a weight sensor, a heading sensor, a yaw sensor, a gyro sensor, a position module, a vehicle forward/reverse sensor, a battery sensor, a fuel sensor, a tire sensor, a steering sensor based on rotation of the steering wheel, a vehicle interior temperature sensor, a vehicle interior humidity sensor, an ultrasonic sensor, a radar, a Lidar, etc.

As such, the sensing unit 760 may acquire sensing signals with regard to, for example, vehicle collision information, vehicle traveling direction information, vehicle location information (GPS information), vehicle angle information, vehicle speed information, vehicle acceleration information, vehicle tilt information, vehicle forward/reverse information, battery information, fuel information, tire information, vehicle lamp information, vehicle interior temperature information, vehicle interior humidity information, steering wheel rotation angle information, etc.

Meanwhile, the sensing unit 760 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 760 may include a biometric sensor. The biometric sensor senses and acquires biometric information of the passenger. The biometric information may include fingerprint information, iris-scan information, retina-scan information, hand geometry information, facial recognition information, and voice recognition information. The biometric sensor may include a sensor for sensing biometric information of the passenger. Here, the monitoring unit 725 and the microphone 723 may operate as a sensor. The biometric sensor may acquire hand geometry information and facial recognition information through the monitoring unit 725.

The output unit 740 is configured to output information processed by the controller 770. The output unit 740 may include a display unit 741, a sound output unit 742, and a haptic output unit 743.

The display unit 741 may display information processed by the controller 770. For example, the display unit 741 may display vehicle associated information. Here, the vehicle associated information may include vehicle control information for direct control of the vehicle or driver assistance information for aiding in driving of the vehicle. In addition, the vehicle associated information may include vehicle state information that indicates the current state of the vehicle or vehicle traveling information regarding traveling of the vehicle.

The display unit 741 may include at least one selected from among a Liquid Crystal Display (LCD), a Thin Film Transistor LCD (TFT LCD), an Organic Light Emitting Diode (OLED), a flexible display, a 3D display, and an e-ink display. The display unit 741 may configure an inter-layer structure with a touch sensor, or may be integrally formed with the touch sensor to implement a touchscreen. The touchscreen may function as the user input unit 724 which provides an input interface between the vehicle and the user and also function to provide an output interface between the vehicle and the user.

In this instance, the display unit 741 may include a touch sensor which senses a touch to the display unit 741 so as to receive a control command in a touch manner. When a touch is input to the display unit 741 as described above, the touch sensor may sense the touch and the controller 770 may generate a control command corresponding to the touch. Content input in a touch manner may be characters or numbers, or may be, for example, instructions in various modes or menu items that may be designated.

Meanwhile, the display unit 741 may include a cluster to allow the driver to check vehicle state information or vehicle traveling information while driving the vehicle. The cluster may be located on a dashboard. In this instance, the driver may check information displayed on the cluster while looking forward.

Meanwhile, in some embodiments, the display unit 741 may be implemented as a head up display (HUD). When the display unit 741 is implemented as a HUD, information may be output via a transparent display provided at the windshield. Alternatively, the display unit 741 may include a projector module to output information via an image projected onto the windshield.

The sound output unit 742 is configured to convert electrical signals from the controller 170 into audio signals and to output the audio signals. Thus, the sound output unit 742 may include, for example, a speaker. The sound output unit 742 may output sound corresponding to the operation of the user input unit 724.

The haptic output unit 743 is configured to generate tactile output. For example, the haptic output unit 743 may operate to vibrate a steering wheel, a safety belt, or a seat so as to allow the user to recognize an output thereof. The vehicle drive unit 750 can control the operation of various devices of the vehicle. The vehicle drive unit 750 may include at least one of a power source drive unit 751, a steering drive unit 752, a brake drive unit 753, a lamp drive unit 754, an air conditioner drive unit 755, a window drive unit 756, an airbag drive unit 757, a sunroof drive unit 758, and a suspension drive unit 759.

The power source drive unit 751 can perform electronic control of a power source inside the vehicle. For example, when a fossil fuel based engine is a power source, the power source drive unit 751 can perform electronic control of the engine. As such, the power source drive unit 751 can control, for example, an output torque of the engine. When the power source drive unit 751 is an engine, the power source drive unit 751 can control the speed of the vehicle by controlling the output torque of the engine under the control of the controller 770.

In another example, when an electric motor is a power source, the power source drive unit 751 can perform control of the motor. As such, the power source drive unit 751 can control, for example, the RPM and torque of the motor.

The steering drive unit 752 can perform electronic control of a steering apparatus inside the vehicle. The steering drive unit 752 may change the direction of travel of the vehicle.

The brake drive unit 753 can perform electronic control of a brake apparatus inside the vehicle. For example, the brake drive unit 753 may reduce the speed of the vehicle by controlling the operation of brakes located at wheels. In another example, the brake drive unit 753 may adjust the direction of travel of the vehicle leftward or rightward by differentiating the operation of respective brakes located at left and right wheels.

The lamp drive unit 754 may turn at least one lamp arranged inside and outside the vehicle on or off. In addition, the lamp drive unit 754 can control, for example, the intensity and direction of light of each lamp. For example, the lamp drive unit 754 can perform control of a turn signal lamp or a brake lamp.

The air conditioner drive unit 755 can perform electronic control of an air conditioner inside the vehicle. For example, when the interior temperature of the vehicle is high, the air conditioner drive unit 755 may operate the air conditioner to supply cold air to the interior of the vehicle.

The window drive unit 756 can perform electronic control of a window apparatus inside the vehicle. For example, the window drive unit 756 can control opening or closing of left and right windows of the vehicle. The airbag drive unit 757 can perform the electronic control of an airbag apparatus inside the vehicle. For example, the airbag drive unit 757 can control an airbag to be deployed in a dangerous situation.

The sunroof drive unit 758 can perform electronic control of a sunroof apparatus inside the vehicle. For example, the sunroof drive unit 758 can control opening or closing of a sunroof. The suspension drive unit 759 can perform electronic control of a suspension apparatus inside the vehicle. For example, when a road surface is uneven, the suspension drive unit 759 can control the suspension apparatus to reduce vibrations of the vehicle.

The memory 730 is electrically connected to the controller 770. The memory 730 may store basic data of the unit, control data for operation control of the unit and input/output data. The memory 730 may be various storage apparatuses, which are implemented in a hardware manner, such as a ROM, RAM, EPROM, flash drive and hard drive. The memory 730 may store a variety of data for overall operation of the vehicle, such as a program for processing or control of the controller 770.

The interface 780 may serve as a passage for various kinds of external devices that are connected to the vehicle. For example, the interface 780 may have a port that is connectable to the mobile terminal 600 and may be connected to the mobile terminal 600 via the port. In this instance, the interface 780 may exchange data with the mobile terminal 600.

The interface 780 may serve as a passage for providing electric energy to the connected mobile terminal 600. When the mobile terminal 600 is electrically connected to the interface 780, the interface 780 may provide electric energy supplied from the power supply unit 790 to the mobile terminal 600 under control of the controller 770.

The controller 770 can control the overall operation of each unit inside the vehicle. The controller 770 may be referred to as an Electronic Control Unit (ECU). The controller 770 can perform a function corresponding to the delivered signal according to delivery of a signal for executing the display apparatus 100.

The controller 770 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and electric units for the implementation of other functions.

The controller 770 can perform the role of the above-described processor 170. That is, the processor 170 of the display apparatus 100 may be directly set in the controller 770 of the vehicle. In such an embodiment, the display apparatus 100 may be understood as a combination of some components of the vehicle. Alternatively, the controller 770 can control the components to transmit information requested by the processor 170.

The power supply unit 790 may supply power required to operate the respective components under the control of the controller 770. In particular, the power supply unit 790 may receive power from, for example, a battery inside the vehicle.

The AVN apparatus 400 may exchange data with the controller 770. The controller 770 may receive navigation information from the AVN apparatus or a separate navigation apparatus. Here, the navigation information may include destination information, information on a route to the destination, map information related to vehicle traveling and current position information of the vehicle.

The display apparatus according to the embodiments shares a virtual traffic signal with another vehicle through wireless communication, thus providing a pre-agreed virtual traffic signal, guiding safe driving, and enhancing traffic efficiency. Specifically, when detecting another vehicle having risk of collision, the display apparatus according to the embodiments generates and display a virtual traffic signal, thus inducing a driver to intuitively perform driving operation in consideration of the risk of collision, preventing collision.

Also, the display apparatus according to the embodiments enables driving according to a pre-agreed traffic signal, thus achieving safe driving and enhancing efficient traffic circulation. That is, the display apparatus according to the embodiments generates and provides an appropriate virtual traffic signal according to various situations, thus achieving safe driving and enhancing traffic efficiency and driver convenience.

The above described features, configurations, effects, and the like are included in at least one of the embodiments of the present invention, and should not be limited to only one embodiment. In addition, the features, configurations, effects, and the like as illustrated in each embodiment may be implemented with regard to other embodiments as they are combined with one another or modified by those skilled in the art. Thus, content related to these combinations and modifications should be construed as including in the scope and spirit of the invention as disclosed in the accompanying claims.

Further, although the embodiments have been mainly described until now, they are just exemplary and do not limit the present invention. Thus, those skilled in the art to which the present invention pertains will know that various modifications and applications which have not been exemplified may be performed within a range which does not deviate from the essential characteristics of the embodiments. For instance, the constituent elements described in detail in the exemplary embodiments can be modified to be performed. Further, the differences related to such modifications and applications shall be construed to be included in the scope of the present invention specified in the attached claims.

What is claimed is:

1. A display apparatus in a vehicle, the display apparatus comprising:

a sensor configured to acquire vehicle periphery information;

a wireless processor configured to transmit and receive information on a virtual traffic signal to and from another vehicle;

a display; and a processor configured to:

detect another vehicle having a possibility of intersection from the vehicle periphery information, generate the virtual traffic signal based on a position relationship between the vehicle and the other vehicle, and display the generated virtual traffic signal on the display.

2. The display apparatus of claim 1, wherein the virtual traffic signal includes a blue light icon indicating a driving permission, a red light icon indicating a driving prohibition, and a yellow light icon indicating a driving caution.

3. The display apparatus of claim 2, wherein, when transmission and reception of information with the other vehicle having the possibility of intersection is not possible in a wireless manner, the processor is further configured to display the virtual traffic signal with the red light icon activated.

4. The display apparatus of claim 1, wherein, when there is no signal light at an intersection before entry to the intersection, the processor is further configured to:

generate the virtual traffic signal, and display the generated virtual traffic signal on the display.

5. The display apparatus of claim 4, wherein, when no other vehicle having the possibility of intersection is detected before entry to the intersection, the processor is further configured to display the virtual traffic signal with a blue light icon activated.

6. The display apparatus of claim 4, wherein the processor is further configured to display the virtual traffic signal before entry to at least one of a ramp section, a bottleneck section, and a crosswalk section.

7. The display apparatus of claim 6, wherein, when a pedestrian having a possibility of intersection is detected, the processor is further configured to display the virtual traffic signal with a red light icon activated.

8. The display apparatus of claim 1, wherein, when the processor detects that the other vehicle enters an intersection area, the processor is further configured to display the virtual traffic signal with a red light icon activated.

9. The display apparatus of claim 1, wherein the processor is further configured to:

display the virtual traffic signal with a blue light icon activated and communicate with the other vehicle to display a virtual traffic signal with a red light icon activated, or display the virtual traffic signal with red light icon activated and communicate with the other vehicle to display the virtual traffic signal with the blue light icon activated.

10. The display apparatus of claim 9, wherein the processor is further configured to:

calculate whether the vehicle or the other vehicle will first reach the intersection area, and display the virtual traffic signal with the blue light icon activated and communicate with the other vehicle to display the virtual traffic signal with the red light icon activated if the vehicle is calculated to first reach the intersection area, or display the virtual traffic signal with the red light icon activated and communicate with the other vehicle to display the virtual traffic signal with the blue light icon activated if the other vehicle is calculated to first reach the intersection area.

11. The display apparatus of claim 1, wherein the processor is further configured to:

update the virtual traffic signal according to a change in the vehicle periphery information, and share the updated virtual traffic signal with the other vehicle through the wireless communication processor.

12. The display apparatus of claim 1, wherein the processor is further configured to:

determine whether the traffic signal is valid according to the vehicle periphery information, and determine whether to generate the virtual traffic signal depending on whether the traffic signal is valid.

13. The display apparatus of claim 12, wherein, when the other vehicle or a pedestrian violating the traffic signal is detected, the processor is further configured to display the virtual traffic signal.

14. The display apparatus of claim 13, wherein the processor is further configured to display the virtual traffic signal in a vicinity of a windshield region on which the traffic signal is viewed.

15. The display apparatus of claim 14, wherein the processor is further configured to display the virtual traffic signal to overlap the windshield region on which the traffic signal is viewed.

16. The display apparatus of claim 14, wherein, when a red light icon indicating a driving prohibition is displayed, the processor is further configured to display a time during which the red light icon is activated.

17. The display apparatus of claim 14, wherein, when a red light icon indicating driving prohibition is displayed, the processor is further configured to display an icon indicating a reason for the driving prohibition.

18. The display apparatus of claim 14, wherein, when a blue light icon indicating a driving permission is displayed, the processor is further configured to display the blue light icon with a shape to indicate a driving direction of the vehicle.

19. The display apparatus of claim 14, wherein, when the other vehicle having the possibility of intersection is a special vehicle, the processor is further configured to display the virtual traffic signal indicating a driving prohibition.

20. The display apparatus of claim 1, wherein the processor is further configured to control an Idle Stop and Go (ISG) function based on the virtual traffic signal.

21. The display apparatus of claim 1, wherein, when the other vehicle is a vehicle ahead and is in a stopped state, and a movement direction of the other vehicle is different from a movement direction of the vehicle, the processor is further configured to display the virtual traffic signal based on a traffic signal of the other vehicle.

* * * * *